United States Patent
McCrea et al.

(10) Patent No.: US 10,805,102 B2
(45) Date of Patent: Oct. 13, 2020

(54) CONTENT RECOMMENDATION SYSTEM

(75) Inventors: John McCrea, Palo Alto, CA (US); Nida Zada, San Jose, CA (US); Ryan King, Palo Alto, CA (US); Jason Li, Menlo Park, CA (US); Christopher Connolly, Santa Clara, CA (US); Peter Lester, Oakland, CA (US); Christopher Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 520 days.

(21) Appl. No.: 13/106,483

(22) Filed: May 12, 2011

(65) Prior Publication Data

US 2011/0288912 A1   Nov. 24, 2011

Related U.S. Application Data

(60) Provisional application No. 61/347,302, filed on May 21, 2010.

(51) Int. Cl.
 *H04L 12/18* (2006.01)
 *G06Q 30/02* (2012.01)
 *H04L 12/58* (2006.01)

(52) U.S. Cl.
 CPC ......... *H04L 12/1827* (2013.01); *G06Q 30/02* (2013.01); *G06Q 30/0217* (2013.01); *G06Q 30/0218* (2013.01); *H04L 51/32* (2013.01)

(58) Field of Classification Search
 None
 See application file for complete search history.

(56) References Cited

U.S. PATENT DOCUMENTS

| | | |
|---|---|---|
| 6,782,551 B1 | 8/2004 | Entwistle |
| 6,925,610 B2 | 8/2005 | Thurston et al. |
| 7,509,663 B2 | 3/2009 | Maynard et al. |
| 7,624,416 B1 * | 11/2009 | Vandermolen et al. ...... 725/109 |
| 7,680,959 B2 * | 3/2010 | Svendsen ..................... 709/248 |
| 7,757,250 B1 | 7/2010 | Horvitz et al. |
| 8,095,432 B1 * | 1/2012 | Berman et al. .............. 705/26.7 |
| 8,180,804 B1 * | 5/2012 | Narayanan et al. .......... 707/798 |

(Continued)

FOREIGN PATENT DOCUMENTS

| | | |
|---|---|---|
| EP | 1454484 B1 | 9/2004 |
| EP | 1901475 A2 | 3/2008 |

(Continued)

OTHER PUBLICATIONS

R. Gaglianello, L. Spergel and D. Liu, "Convergence of telephony and television: More than a computer on your TV," 2009 IEEE International Symposium on Broadband Multimedia Systems and Broadcasting, Bilbao, 2009, pp. 1-7, doi: 10.1109/ISBMSB.2009.5133763. (Year: 2009).*

(Continued)

*Primary Examiner* — Jacob C. Coppola
(74) *Attorney, Agent, or Firm* — Banner & Witcoff, Ltd.

(57) ABSTRACT

A content recommendation system is disclosed that allows users to identify friends, recommend content to friends, and receive awards for influencing friends. Interfaces can be used to display rankings of recommended programs, user profiles and their awards, and dynamic chats relating to specific content.

32 Claims, 15 Drawing Sheets

(56) References Cited

U.S. PATENT DOCUMENTS

| | | | |
|---|---|---|---|
| 8,291,321 B2 | 10/2012 | Matsubayashi | |
| 8,302,127 B2 | 10/2012 | Klarfeld et al. | |
| 8,397,257 B1 | 3/2013 | Barber | |
| 8,554,640 B1 | 10/2013 | Dykstra et al. | |
| 8,555,177 B1* | 10/2013 | Junee | H04L 65/403 715/751 |
| 8,677,415 B2 | 3/2014 | Angiolillo et al. | |
| 8,692,763 B1 | 4/2014 | Kim | |
| 8,793,735 B2 | 7/2014 | VanDuyn et al. | |
| 8,856,833 B2* | 10/2014 | Conness | H04N 5/44543 725/45 |
| 9,147,000 B2 | 9/2015 | Vasudevan et al. | |
| 9,183,523 B2 | 11/2015 | Cudak et al. | |
| 9,246,613 B2* | 1/2016 | McKee | G06Q 10/105 |
| 9,247,300 B2 | 1/2016 | Oddo et al. | |
| 9,342,576 B2 | 5/2016 | Saito et al. | |
| 9,407,751 B2 | 8/2016 | Hansen et al. | |
| 9,426,509 B2 | 8/2016 | Ellis et al. | |
| 9,554,163 B2 | 1/2017 | Ellis et al. | |
| 9,832,501 B2 | 11/2017 | Ruffini et al. | |
| 2002/0004742 A1* | 1/2002 | Willcocks et al. | 705/14 |
| 2002/0004748 A1* | 1/2002 | Koga | G06Q 30/02 705/14.1 |
| 2002/0085024 A1* | 7/2002 | White et al. | 345/738 |
| 2002/0152224 A1 | 10/2002 | Roth et al. | |
| 2002/0152459 A1 | 10/2002 | Bates et al. | |
| 2002/0199188 A1 | 12/2002 | Sie et al. | |
| 2003/0084448 A1 | 5/2003 | Soundararajan | |
| 2003/0145338 A1* | 7/2003 | Harrington | 725/136 |
| 2003/0233278 A1* | 12/2003 | Marshall | 705/14 |
| 2004/0031046 A1* | 2/2004 | Weinblatt | G06Q 30/02 725/23 |
| 2004/0122736 A1* | 6/2004 | Strock | G06Q 30/02 705/14.31 |
| 2004/0203901 A1* | 10/2004 | Wilson et al. | 455/456.1 |
| 2004/0230484 A1* | 11/2004 | Greenlee | G06Q 30/02 705/14.16 |
| 2004/0244030 A1 | 12/2004 | Boyce et al. | |
| 2005/0049858 A1 | 3/2005 | Busayapongchai | |
| 2005/0192000 A1* | 9/2005 | Lloyd | 455/420 |
| 2006/0031882 A1 | 2/2006 | Swix et al. | |
| 2006/0041478 A1* | 2/2006 | Zheng | G06Q 30/02 705/14.56 |
| 2006/0047678 A1 | 3/2006 | Miyazaki et al. | |
| 2006/0048184 A1 | 3/2006 | Poslinski et al. | |
| 2006/0143236 A1* | 6/2006 | Wu | 707/104.1 |
| 2006/0143653 A1* | 6/2006 | Suh | 725/46 |
| 2006/0149617 A1* | 7/2006 | Yamashita et al. | 705/14 |
| 2006/0156329 A1* | 7/2006 | Treese | H04H 60/31 725/23 |
| 2006/0176398 A1 | 8/2006 | Kang | |
| 2006/0225088 A1 | 10/2006 | Gutta | |
| 2006/0277100 A1* | 12/2006 | Parham | G06Q 30/02 705/14.14 |
| 2007/0061863 A1* | 3/2007 | Rajasekaran | 726/2 |
| 2007/0192723 A1 | 8/2007 | Anzelde et al. | |
| 2007/0196795 A1 | 8/2007 | Groff | |
| 2007/0207780 A1* | 9/2007 | McLean | 455/414.1 |
| 2007/0294131 A1* | 12/2007 | Roman | G06Q 30/02 705/14.1 |
| 2008/0055272 A1* | 3/2008 | Anzures et al. | 345/173 |
| 2008/0083001 A1 | 4/2008 | Peacock et al. | |
| 2008/0177617 A1* | 7/2008 | Gupta | 705/10 |
| 2008/0209229 A1 | 8/2008 | Ramakrishnan et al. | |
| 2008/0243733 A1* | 10/2008 | Black | 706/16 |
| 2008/0276273 A1 | 11/2008 | Billmaier et al. | |
| 2008/0320139 A1* | 12/2008 | Fukuda | G06Q 30/02 709/226 |
| 2009/0019375 A1* | 1/2009 | Garofalo | 715/753 |
| 2009/0083116 A1* | 3/2009 | Svendsen | 705/26 |
| 2009/0083779 A1* | 3/2009 | Shteyn et al. | 725/14 |
| 2009/0089352 A1* | 4/2009 | Davis | G06Q 10/00 709/201 |
| 2009/0100463 A1 | 4/2009 | St. John-Larkin | |
| 2009/0119294 A1* | 5/2009 | Purdy et al. | 707/7 |
| 2009/0132935 A1* | 5/2009 | Van Zwol | 715/756 |
| 2009/0144635 A1 | 6/2009 | Miyazaki et al. | |
| 2009/0158326 A1 | 6/2009 | Hunt et al. | |
| 2009/0172161 A1* | 7/2009 | Singh | 709/225 |
| 2009/0216577 A1* | 8/2009 | Killebrew | 705/7 |
| 2009/0234876 A1* | 9/2009 | Schigel | H04L 51/02 |
| 2009/0281888 A1* | 11/2009 | Zai et al. | 705/14.25 |
| 2009/0300670 A1* | 12/2009 | Barish | 725/13 |
| 2010/0023506 A1 | 1/2010 | Sahni et al. | |
| 2010/0058376 A1* | 3/2010 | Alhadeff | H04H 60/31 725/10 |
| 2010/0083115 A1 | 4/2010 | Park | |
| 2010/0122207 A1 | 5/2010 | Kim et al. | |
| 2010/0138867 A1 | 6/2010 | Wong et al. | |
| 2010/0162289 A1* | 6/2010 | Sanders | H04N 21/4758 725/23 |
| 2010/0229212 A1* | 9/2010 | Liu et al. | 725/109 |
| 2010/0241699 A1* | 9/2010 | Muthukumarasamy et al. | 709/203 |
| 2010/0250341 A1 | 9/2010 | Hauser | |
| 2010/0251305 A1 | 9/2010 | Kimble et al. | |
| 2010/0318611 A1* | 12/2010 | Curtin et al. | 709/206 |
| 2010/0325544 A1* | 12/2010 | Alhadeff | G06F 3/0416 715/716 |
| 2010/0325646 A1* | 12/2010 | Alhadeff | G06Q 30/02 725/10 |
| 2010/0332330 A1* | 12/2010 | Goel et al. | 705/14.66 |
| 2011/0035445 A1* | 2/2011 | Eickhoff | 709/204 |
| 2011/0124408 A1* | 5/2011 | Ward | G07F 17/3223 463/27 |
| 2011/0154213 A1 | 6/2011 | Wheatley et al. | |
| 2011/0161148 A1* | 6/2011 | Schmidt | G06Q 30/02 705/14.16 |
| 2011/0184792 A1* | 7/2011 | Butcher et al. | 705/14.13 |
| 2011/0231265 A1 | 9/2011 | Brown et al. | |
| 2011/0264494 A1* | 10/2011 | Lechowicz | G06Q 30/02 705/14.12 |
| 2011/0276882 A1* | 11/2011 | Buehler | H04H 60/31 715/727 |
| 2011/0312375 A1 | 12/2011 | Kim et al. | |
| 2012/0047008 A1* | 2/2012 | Alhadeff | G06Q 30/0214 705/14.16 |
| 2012/0064820 A1 | 3/2012 | Bemmel | |
| 2012/0089705 A1 | 4/2012 | French | |
| 2012/0243850 A1 | 9/2012 | Basra et al. | |
| 2013/0046772 A1 | 2/2013 | Gu et al. | |
| 2013/0057765 A1 | 3/2013 | Zeleznikar | |
| 2013/0103628 A1 | 4/2013 | Skelton et al. | |
| 2013/0125161 A1 | 5/2013 | Herby et al. | |
| 2013/0297447 A1 | 11/2013 | Sakata | |
| 2013/0322850 A1 | 12/2013 | Chang | |
| 2014/0019902 A1 | 1/2014 | DeLuca et al. | |
| 2014/0033240 A1 | 1/2014 | Card, II | |
| 2014/0046660 A1 | 2/2014 | Kamdar | |
| 2014/0123160 A1 | 5/2014 | van Coppenolle et al. | |
| 2014/0130076 A1 | 5/2014 | Moore et al. | |
| 2014/0132524 A1 | 5/2014 | Lee | |
| 2014/0149424 A1 | 5/2014 | Kalmes et al. | |
| 2014/0215506 A1 | 7/2014 | Kalmes et al. | |
| 2014/0331260 A1 | 11/2014 | Gratton | |
| 2015/0003595 A1 | 1/2015 | Yaghi et al. | |
| 2015/0012416 A1 | 1/2015 | Woods | |
| 2015/0066652 A1 | 3/2015 | Collins et al. | |
| 2015/0089517 A1 | 3/2015 | Ruffini et al. | |
| 2015/0121408 A1 | 4/2015 | Jacoby et al. | |
| 2015/0133164 A1 | 5/2015 | Song et al. | |
| 2015/0143394 A1 | 5/2015 | Hijikata et al. | |
| 2015/0148005 A1 | 5/2015 | Chau et al. | |
| 2015/0169189 A1 | 6/2015 | Want et al. | |
| 2015/0195621 A1 | 7/2015 | Harron et al. | |
| 2015/0199708 A1 | 7/2015 | Ying et al. | |
| 2015/0287219 A1 | 10/2015 | Liang et al. | |
| 2015/0319468 A1 | 11/2015 | Park et al. | |

(56) References Cited

U.S. PATENT DOCUMENTS

2015/0350709 A1 12/2015 Tomita
2016/0063998 A1 3/2016 Krishnamoorthy et al.

FOREIGN PATENT DOCUMENTS

WO WO 2007143562 A2 * 12/2007
WO 2011002572 A1 1/2011

OTHER PUBLICATIONS

J. B. Carlucci, "Social Media Television in Today's Cable Systems," 2010 7th IEEE Consumer Communications and Networking Conference, Las Vegas, NV, 2010, pp. 1-5, doi: 10.1109/CCNC.2010.5421636. (Year: 2010).*

D. C. A. Bulterman, P. Cesar, A. J. Jansen, H. Knoche and W. Seager, "Enabling Pro-Active User-Centered Recommender Systems: An Initial Evaluation," Ninth IEEE International Symposium on Multimedia Workshops (ISMW 2007), Beijing, 2007, pp. 195-200, doi: 10.1109/ISM.Workshops.2007.41. (Year: 2007).*

P. Cesar, D. C. A. Bulterman and A. J. Jansen, "Social Sharing of Television Content: An Architecture," Ninth IEEE International Symposium on Multimedia Workshops (ISMW 2007), Beijing, 2007, pp. 145-150, doi: 10.1109/ISM.Workshops.2007.34. (Year: 2007).*

EP 11166793.9-221 Search Report dated Aug. 5, 2011.
European Office Action—EP Appl. 11166793.7—dated Oct. 8, 2015.
European Summons to Oral Proceedings—EP Appl. 11166793.7—dated Apr. 12, 2017.
Canadian Office Action—CA Application No. 2740650—dated Feb. 28, 2017.
Alan Henry. How to Track All Your TV Shows So You Never Miss an Episode, Lifehacker, http://lifehacker/how-to-track-all-your-tv-shows-so-you-never-miss-an-epi-1180239026, 2013, 11 pages.
Thorin Klosowski. Netflix Profiles Ensure Roommates Won't Mess Up Your Recommendations, Lifehacker, http://lifehacker.com/netflix-profiles-ensure-roommates-wont-mess-up-your-re-987927584, dated Aug. 1, 2013, 11 pages.
Entertainment Fiend: Keep Track of Watched TV Show & Movies and Plan What to Watch—Updated for 2011 Edition, dated Oct. 13, 2011, http://entertainmentfiend.blogspot.com/2011/10/keeping-track-of-watched-tv-shows.html, retrieved Jul. 31, 2014, 2 pages.
Entertainment Fiend: Keep Track of Watched TV Show Episodes and Movies and Plan What to Watch! dated Apr. 11, 2008, http://entertainmentfiend.blogspot.com/2008/04/keep-track-of-watched-tv-show-episodes.html, retrieved Jul. 31, 2014, 4 pages.
Feb. 2, 2018—Canadian Office Action—CA 2,740,650.
Feb. 21, 2019—Canadian Office Action—CA 2,740,650.
Mar. 12, 2020—Canadian Office Action—CA 2,740,650.

* cited by examiner

CONTENT RECOMMENDATION SYSTEM

CROSS REFERENCE TO RELATED CASES

This application claims priority to U.S. Provisional Application No. 61/347,302, filed May 20, 2010, and entitled "Content Recommendation System," the entire contents of which are hereby incorporated by reference as a nonlimiting example embodiment.

BACKGROUND

Watching television has traditionally been a fairly private experience, with viewers tending to watch their own programs in their own homes. Newspaper schedules, television commercials, and electronic program guides have helped viewers find programs of interest. better ways to engage viewers, and to provide them with an optimal content experience. Features described herein provide help with keeping viewers (or listeners, in the case of audio content) engaged.

BRIEF SUMMARY

Various features described herein may be used to provide a social network content recommendation system. The system can, in one aspect, maintain, a content recommendation system, receive an indication that a first user is consuming an identified piece of content (e.g., such as when a user begins viewing a television show, or an Internet streaming video), identify friends of the first user, transmit messages to the friends, informing them that the first user is consuming the piece of content, receive responses from the friends, indicating that the other users are also consuming they or piece of content, and reward the first user based on the responses from the friends. Such a system can allow users to offer recommendations to their friends for accessing content.

In another aspect, the system can provide a user profile for the first user, and the user profile can include a graphic identifying the reward received by the first user. The system can also store award profile information, identify video content recommendation criteria and corresponding awards to be granted to users whose program recommendations satisfy the criteria.

In some embodiments, credit for a particular recommendation can be divided among multiple users who gave the same recommendation. The recommendation credit can be allocated and adjusted based on a variety of factors. For example, recommendation credit for a user can be adjusted based on whether the recommending user was still consuming a recommended content when the responding user responded to the recommendation, determining a time window during which a recommending user will receive credit for a recommendation, and/or determining a time remaining in a piece of content at a time that a recommending user sends a recommendation and using the time remaining to identify a time of expiration for the recommender's time window.

Adjusting credit can also include giving different amounts of recommendation credit to recommenders based on how they sent their recommendation. For example, recommenders who used a direct message to send a recommendation to the responding user may receive a different amount of credit as compared to recommenders who used a multicast message to send the recommendation. Alternatively, or additionally, different amounts of recommendation credit can be given to recommenders based on their respective geographic proximity to the responding user. A recommendation ranking level can be assigned to each user, and the adjusting can further comprise adjusting recommendation credit based on a recommender's recommendation ranking level.

Users can be assigned a recommendation ranking level based on how influential that user is over the user's friends, and recommendation credit can be allocated based on this recommendation level.

The system may also offer a display, such as an Internet page, with a trending panel listing content ranked based on the number of users accessing the content, and animating the trending panel to dynamically rearrange the listing as the rankings are updated. The ranked content can include a variety of different types, such as scheduled or on-demanc television programs, Internet videos, audio or other data content The foregoing is only a summary, and these and other features are discussed further below.

DESCRIPTION OF THE DRAWINGS

Some features herein are illustrated by way of example, and not by way of limitation, in the figures of the accompanying drawings and in which like reference numerals refer to similar elements.

FIGS. 7A&B illustrate example user profile display screens for a content recommendation system.

DETAILED DESCRIPTION

In some embodiments, a profile system such as an online profile system may be created to keep track of individual users of content (e.g., viewers or consumers of video audio and/or data content, etc.). The profile system may be implemented using one or more local or public computer servers connected to one or more information networks, such as the Internet, and may be accessed by users through any desired connection. For example, users may use a personal computer, mobile phone, netbook, home gateway device, set-top box, digital video recorder, remote control, etc. to access the one or more profile servers, and to access the underlying content (e.g., television programs, movies, music, Internet content, etc.). The profile server and content accessing devices may be implemented using any desired computing hardware and software, which may include one or more processors and one or more computer-readable media (e.g., memories, RAM, Flash, hard drive, optical disk, etc.) storing computer-executable instructions that, when executed by the processor, cause the hardware to perform as described.

Figure 1:
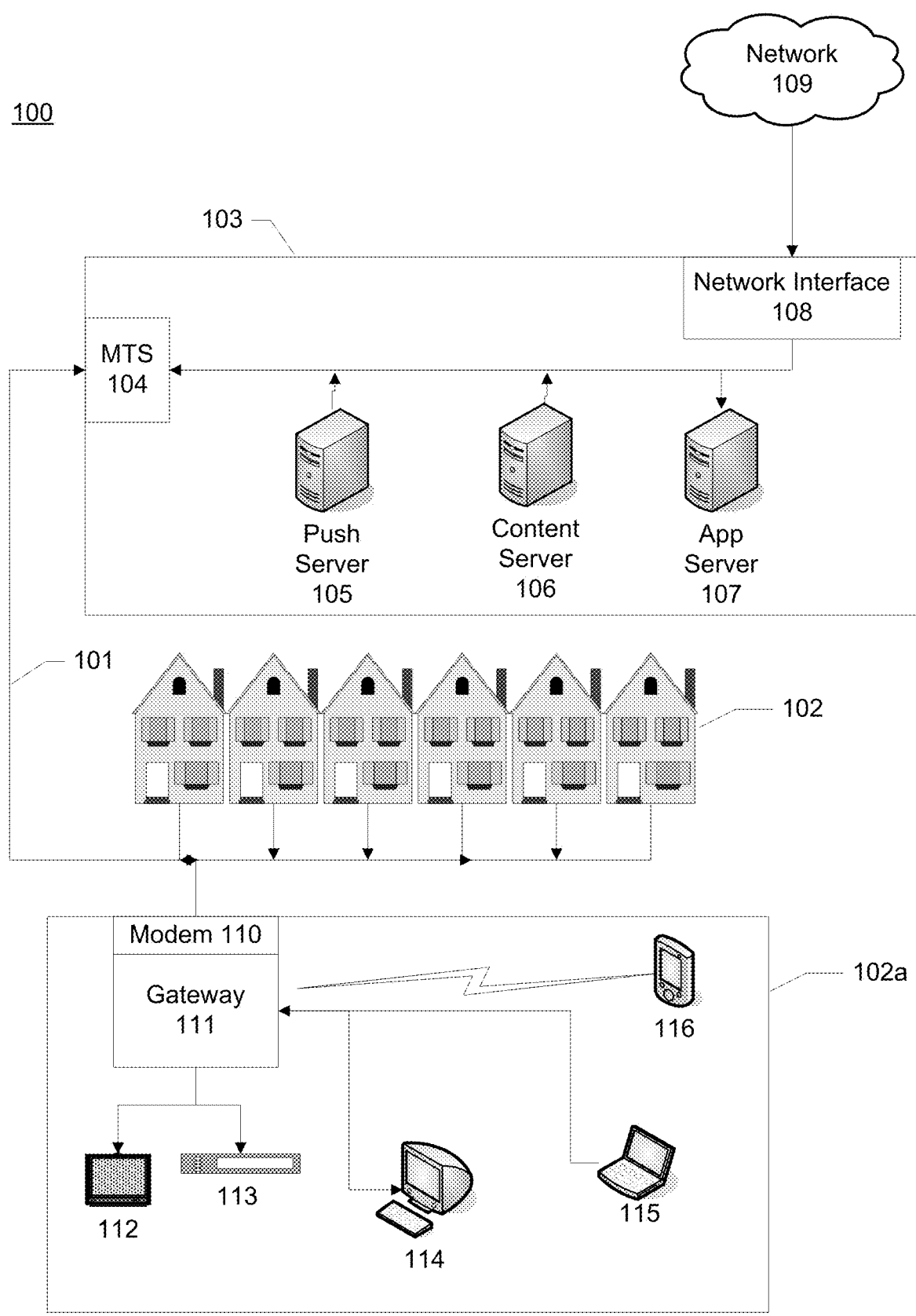
FIG. 1 illustrates an example communication network on which various features described herein may be implemented.

FIG. 1 illustrates an example information distribution or access network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 may use a series of interconnected communication lines 101 (e.g., coaxial cables, optical fibers, wireless links, etc.) to connect multiple premises 102 (e.g., businesses, homes, consumer dwellings, etc.) to a central office 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 serviced by the central office 103 or in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a modem termination system (MTS) 104, such as a cable modem termination system (CMTS), which may be a computing device configured to manage communications between devices on the network of lines 101 and backend devices such as servers 105-107 (to be discussed further below). The MTS may be as specified in a standard, such as, in the example of an HFC network, the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various homes 102, and to receive upstream communications from those modems on one or more upstream frequencies. The central office 103 may also include or be associated with one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and with other devices on the network 109 such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience. An application server 107 can be programmed to provide the various content recommendation system features described herein, and can be used to implement a profile server as described below.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device or a device such as a satellite receiver. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a standalone device, or may be implemented in a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
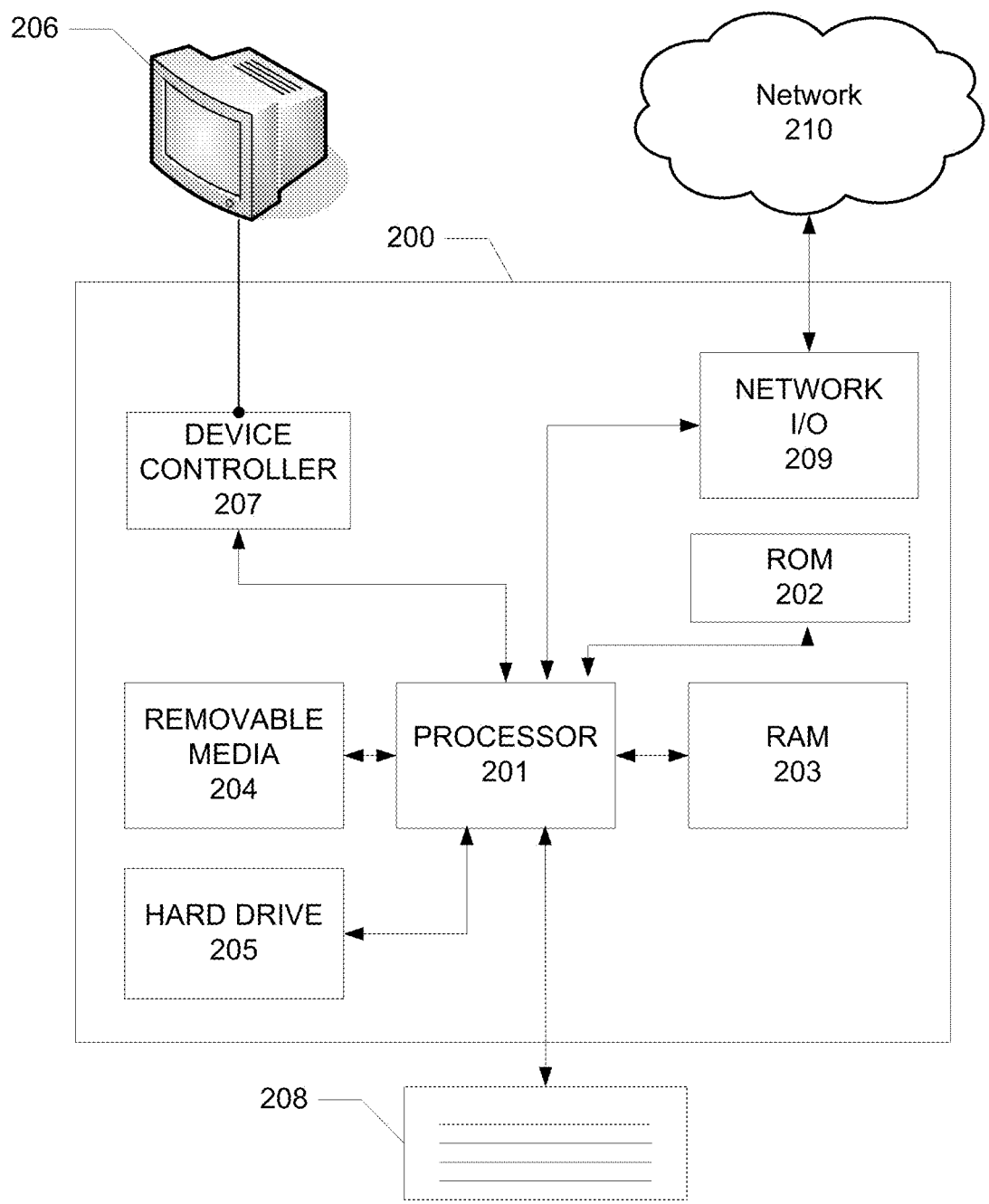
FIG. 2 illustrates an example computing device on which various features described herein may be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

FIGS. 3A-3F illustrate example steps that can be performed by a server, such as an application server 107, to support a content recommendation system. The server 107 may perform this process by executing computer-executable software instructions stored in an internal memory, such as RAM 203. The application server 107 may avail its services to users in any desired manner. For example, an Internet page may be provided to allow users to access the content recommendation system. FIG. 4 illustrates an example Internet page 400. The page 400 may include one or more options 401 (e.g., selectable button) for signing in.

In step 301, the system may determine whether a new user has selected an option to sign in using, for example, an Internet page. If a new user has made such a request, then the system may proceed to step 302, and collect information from the new user, e.g., through an Internet screen. The system may receive a user identification (e.g., an alphanumeric name, an email address, a device identifier such as a Media Access Control address, etc.), and may generate a password associated therewith.

In step 303, the system may ask the user to identify one or more additional accounts that may be linked with the one being created. The other accounts may be any desired account with any different service. For example, the user may have accounts with different social networking sites, such as PLAXO™, FACEBOOK™ and TWITTER™. In step 303, the user can be asked (e.g., via web page prompt) to enter information for each additional account. The entered information may include, for example, an Internet address for the account (e.g., a Universal Resource Locator), an identifier for the user (e.g., an alphanumeric name), and a password. Upon receipt of this information, the system may store (e.g., in a user profile, discussed further below) information identifying these additional sites and/or accounts as being associated and linked with the user.

In addition to identifying social networking accounts, the user may also identify one or more content access accounts. For example, a particular user may be a member of one or more video streaming services (e.g., FANCAST XFINITY TV™, HULU™ NETFLIX™, etc.), and in step 303 the user can provide user identification and password information for those accounts as well. As will be described below, in some embodiments, the user may use the current system to transmit program listings and recommendations to external servers.

In step 304, the system may ask the user to add contact information for the user's new or existing friends. If the user's linked accounts already include contact lists or friends, the recommendation system can transmit a request to servers for the user's linked accounts, requesting a listing of the new user's friends on those linked accounts. The request may include authorization information from the new user (e.g., the new user's password and identifier for the linked account), and the linked account server may respond by transmitting a listing of the user's contacts or friends. If no linked accounts exist, the user can simply enter contact information. For example, the system may ask the user to enter email addresses for one or more friends, and may store those addresses in the user's profile. The system may initially transmit a message to the email address, asking the recipient to confirm that they are an acquaintance of the new user.

In step 305, the system may allow the user to establish preferences. For example, the user could be allowed to set a preference indicating how widely (e.g., which friends, public dissemination, etc.) or how long (e.g., duration in time) the new user's recommendations such as television viewing postings (discussed below), will be disseminated.

In step 306, the system may create and store a user profile for the new user. The profile may be a data file stored, for example, in the system's hard drive memory 205. The profile may store any desired information regarding the new user. This information may include the following:

User ID and password—as noted above, this information can be used to identify and authenticate the user to the system. Similar identification information can be stored for any other linked accounts that the new user identifies in step 303.

Friends List—the profile may store a listing of email addresses and/or other identifiers of the new user's friends. This may, for example, be limited to a list of the friends who have confirmed the user as a friend.

Preferences—as noted in step 305, the system may store additional data identifying various preferences for the user.

Award Status information—As will be discussed further below, users of the content recommendation system may be given various awards relating to their accessing and/or recommending of content. A wide range of awards may be used. For example, a user may be granted point values for various activities, and the profile may store a record of the user's current point total. The point totals may be associated with predetermined ranks in the system as well (e.g., 100 points is Rank 2, 500 points is Rank 3, etc.).

Other awards may be granted for more specific accomplishments, and may be defined by the system. For example, the system may grant a "Comedian" award to users who view a predetermined number (e.g., 10) of comedy movies. Other awards may be granted for a user who recommends a high number of programs, or who accepts a predetermined number of others' recommendations or types of recommendations. Various awards are discussed further below, and the profile in step 306 may store information identifying awards that the user has received. In addition to identifications of the actual awards that a user has received, the award information may also identify the user's progress towards awards that have not yet been received. So, for example, if the user has only watched 3 comedy movies, the profile may identify this total for the corresponding "Comedian" award.

The user's profile may also store a listing of content that the user has previously accessed. This can include, for example, a listing of the time, title (or other program identifier) and service (e.g., station or network offering a television program) for various television shows that the user has watched.

When the system is finished signing up the new user (or users), or if no new user requests are received in step 301, the system may proceed to step 307, and determine whether a user is requesting to sign in. This sign-in request can also be made, for example, by the user requesting an web page 400, or by choosing a sign-in option 401, while browsing the Internet or another network on a computer 114 and watching television 112. Alternatively, the user can be viewing a streaming video on the same computer 114 that is used to access the content recommendation system web site.

Figure 5A:
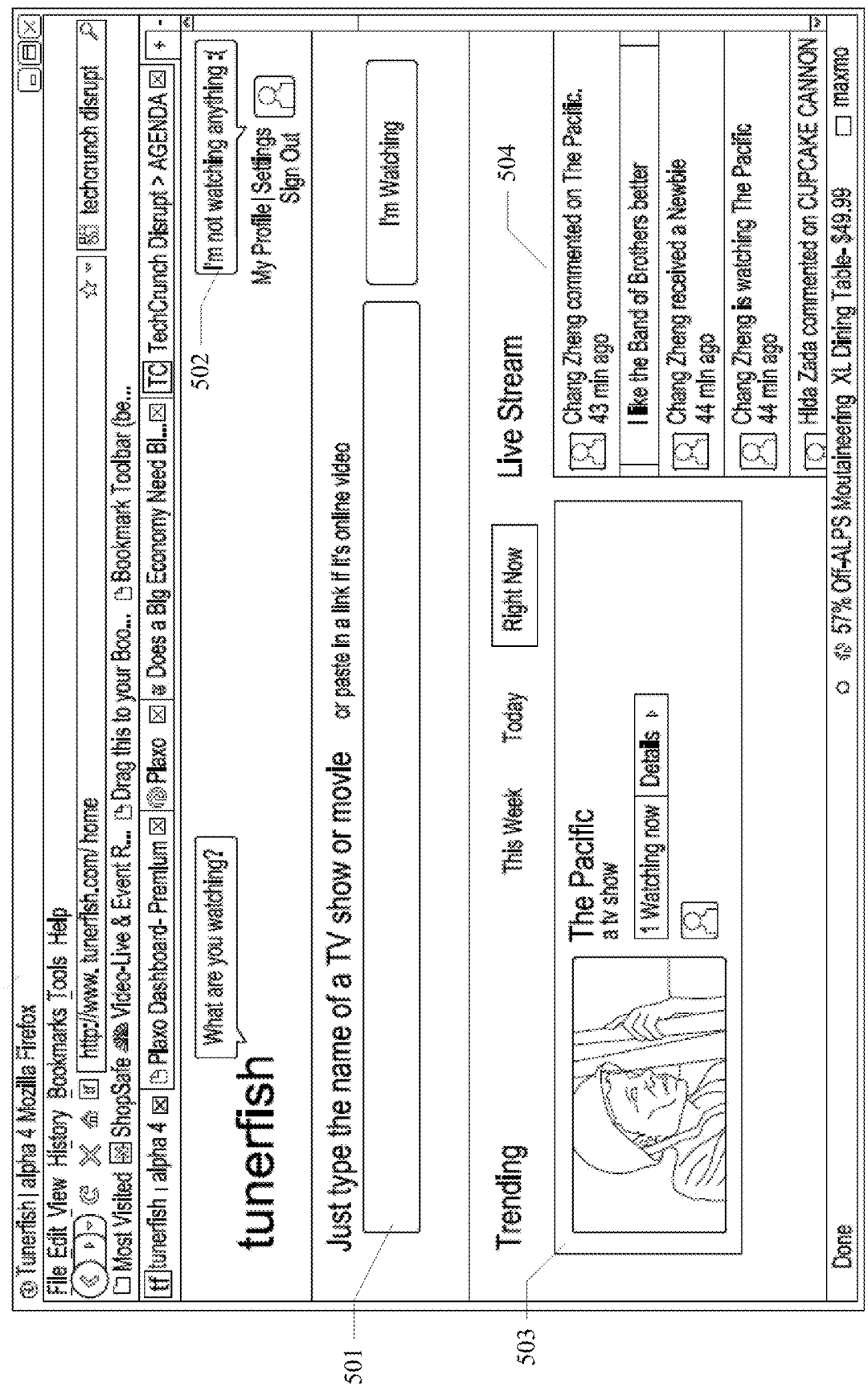
FIGS. 5A&B illustrate example display screens for a content recommendation system.

If a user has requested to sign in, then the system can authenticate the user in step 308 by, for example, requesting that the user enter a User ID and Password, and comparing the information with that in the profile for that User ID. Assuming the user is authenticated, the system in step 309 may retrieve additional data from the user's profile, and in step 310 the system may generate the user's initial display. The initial display may include a default screen and, if desired, advertising. FIG. 5A illustrates an example screen 500, and the default portions may include the top portion of the display, borders, backgrounds, etc. Once generated, the initial display may be retained in memory pending update (discussed below), or it may be transmitted to the user to allow partial display before the update.

Figure 5B:
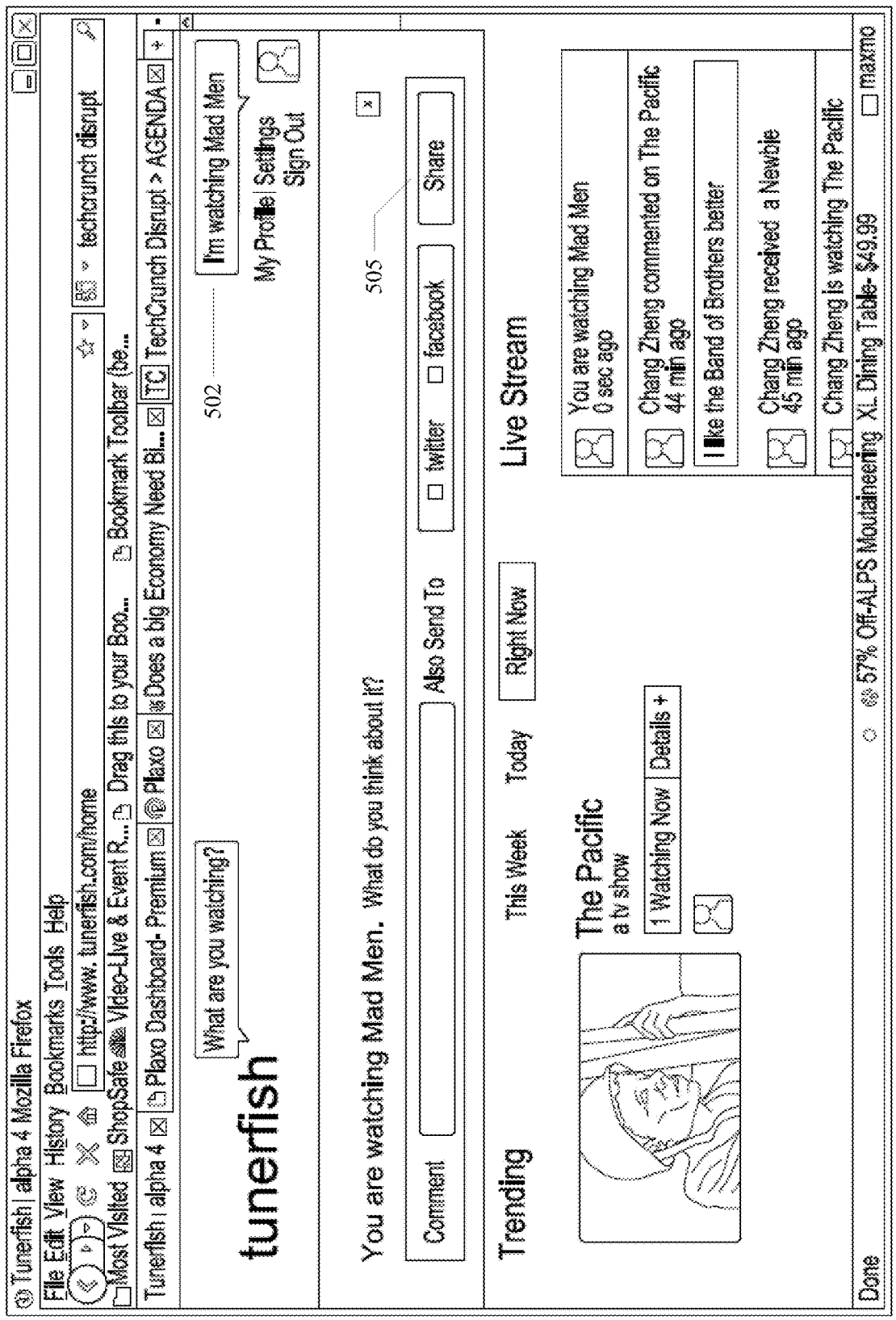

In step 311, the system may conduct a looping process to update the displayed information for each user who is signed in. Referring to the FIG. 5A example, the displayed information on the screen 500 may include a text box 501 in which the user may enter the title of content they are currently watching/listening to/consuming, and the result 502 would be posted as part of the user's current status in an online profile. FIG. 5B illustrates an example in which the user's information 502 is updated to indicate he is watching "Mad Men." The profile status may be transmitted to or shared with other users, such as identified friends of the first user. FIG. 5B illustrates an example share option 505 to transmit the status as an update to one or more external social networking sites. Text box entry may be performed in step 312, and may follow the example process shown in FIG. 3C, discussed below.

Referring to FIG. 5A. The screen may include a trending panel 503, which may display information identifying content that is most popular among the user's friends. The trending panel 503 may contain, for example, an animated, dynamic ladder listing of the most popular content, such as the example described further below. The popularity can be determined, for example, based on the number of friends who are accessing the content at a given time period (e.g., right now, within the last day or week, etc.). As the popularity changes (e.g., as more friends watch a listed show, or friends stop watching a show), the ladder listing can dynamically change to show a rearranging of the listed content. The trending panel 503 may be updated in step 313 for each use or a group of users, and an example process for this is shown in FIG. 3D, discussed further below.

The screen 500 may also include a chat stream 504, which allows users to engage in live chats with their friends regarding the various pieces of content that they are accessing. For example, different friends may post messages about the show highlighted in the trending panel 503, and the messages may automatically include the content title in the posting. The messages may appear each time a user's friend recommends a show, posts a comment about a show, accesses content, or otherwise takes action involving the profile server. For example, the chat stream can serve as a news feed, posting updates whenever a status update has occurred with a friend. Recommendations and posts from friends can serve to influence a user's content habits, as discussed further below. Messages may also be posted whenever a friend indicates that they are accessing content (e.g., if they indicate that they are watching an episode of "Lost," a chat message may appear indicating this fact). Updating this chat stream 504 for the various users may occur in step 314, using, for example, the flow in FIG. 3E (discussed further below).

Other information not appearing on the example screen 500 may be updated as well. For example, in step 315, the system may update user awards. As noted above, the recommendation system may track user activities, and may define various awards that can be granted to users whose activities meet the requirements for the particular award. FIG. 3F, discussed further below, provides an example for tracking and updating user awards.

After the user's main screen 500 information has been updated, the system can proceed with other types of services. For example, in step 316 (FIG. 3B), the system may determine whether a user has requested to view a different screen, such as information for a particular program. Selecting the particular program can be as simple as viewing an onscreen program guide (e.g., provided by gateway 111, or television 112, on a computer 114, etc.), and selecting one with a mouse click.

Figure 6:
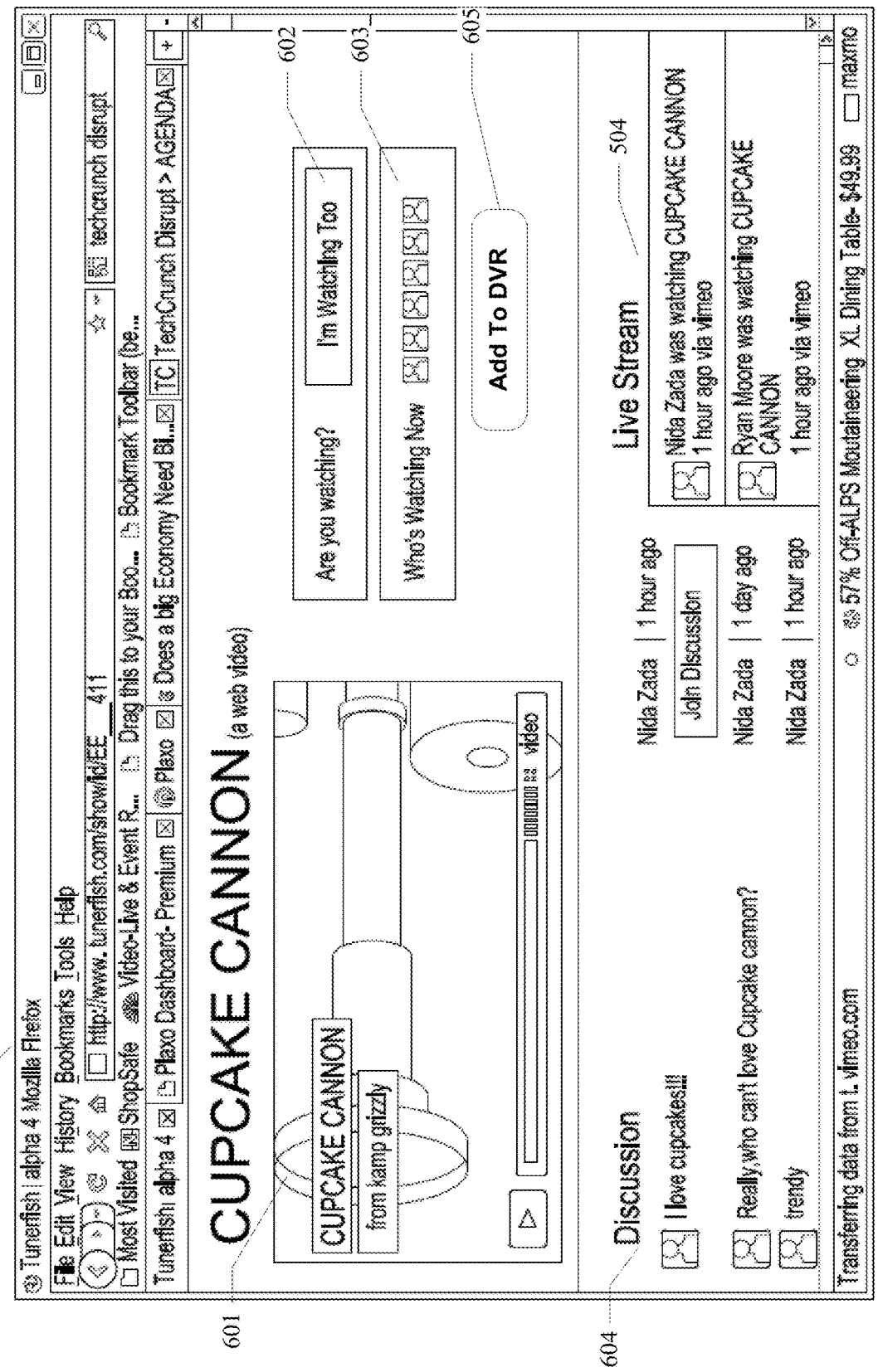
FIG. 6 illustrates an example information display screen for a content recommendation system.

If a user has chosen to view information for a piece of content, the system may generate at step 317 a display 600 shown in FIG. 6, which illustrates an example display in which a particular program has been selected (a "Cupcake Cannon" Internet video available for streaming) The display 600 may offer the content itself 601, but may also provide different information. For example, the display may offer an option 602 of indicating that the user is also currently watching this selected content (or that the user has decided to watch the content in response to a recommendation). In response to selecting option 602, the system may process a comment similar to that described further below regarding FIG. 3C. The user may also be provided with a listing 603 of other friends who are watching the selected program (data for which can be gathered as described regarding FIG. 3C), and a program discussion panel 604 containing posts and comments about the selected program. The program discussion panel 604 may be focused on the currently-selected program, and the screen 600 may also include the same chat stream panel 504 from screen 500, which would allow the user to participate in a more general chat conversation in parallel with the program-specific one.

The user may also be given an option to send a request to an external account, such as a registered FANCAST XFINITY TV™ account, to have the selected program automatically recorded to the user's DVR. For example, an "Add to DVR" button 605 may, when pressed, cause the system to transmit an external message to a server previously identified in step 303. The external message may include, for example, an identification of the selected program (e.g., a program identifier, title, etc.), and authorization information to identify and authenticate the user with an external server (e.g., an application server 107 handling the user's account) that can, in turn, transmit a command to cause the user's DVR to record the selected program when it is available. For example, an application server 107 handling the user's DVR account may offer an Internet-based option to set the user's DVR recordings, and the external command may cause the server to use this option to search for the selected program in the server 107's own offerings (e.g., finding a time/channel/service where the 'Cupcake Cannon' program is available on the external service by searching its program guide listings) and issue a DVR recording command. An external DVR service is described above, but other services can be used as well. For example, if the user has an account with an external content streaming service, selecting the option 605 may cause the service's server to add the selected program to an on demand playlist associated with the user.

Figure 7A:
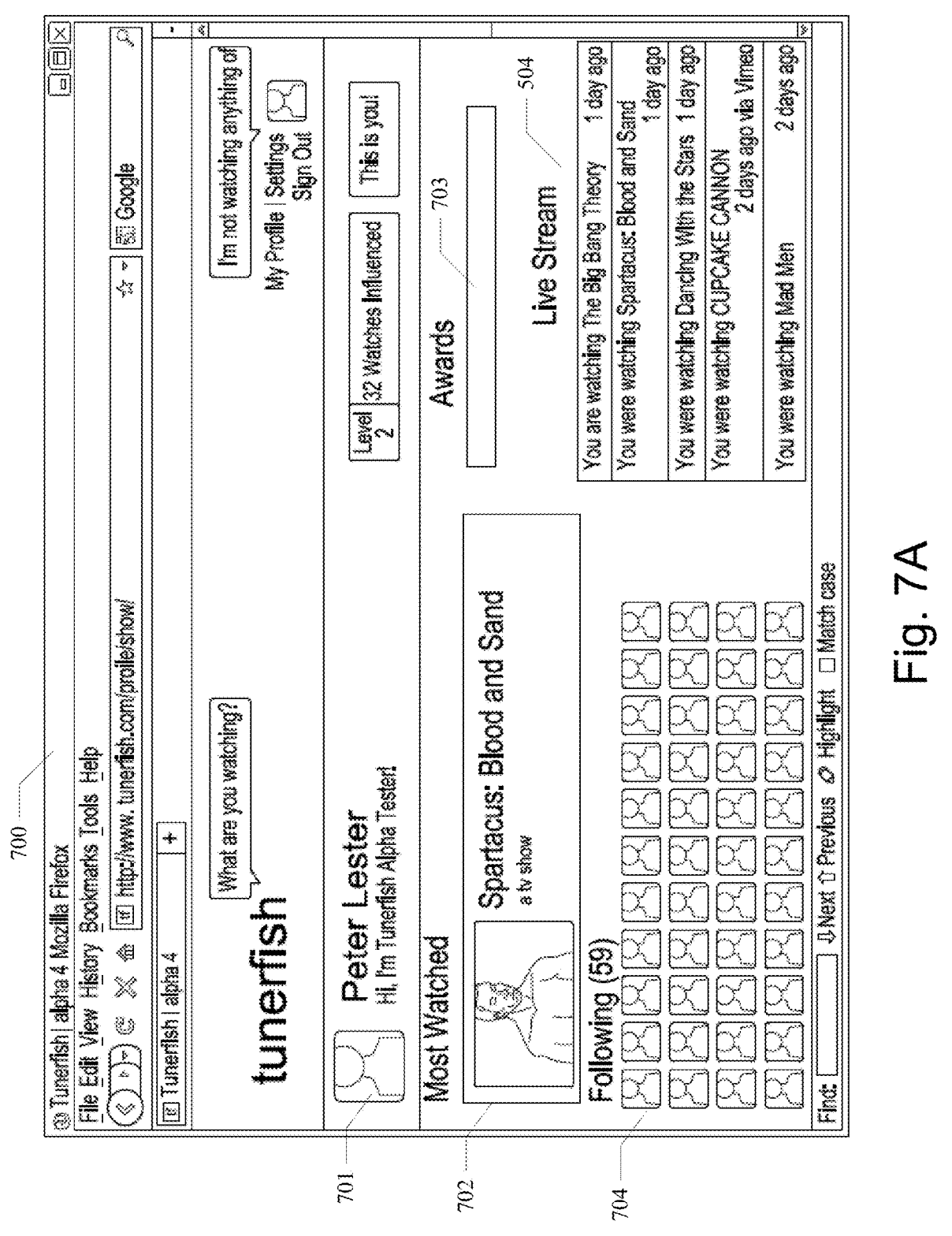
Figure 7B:
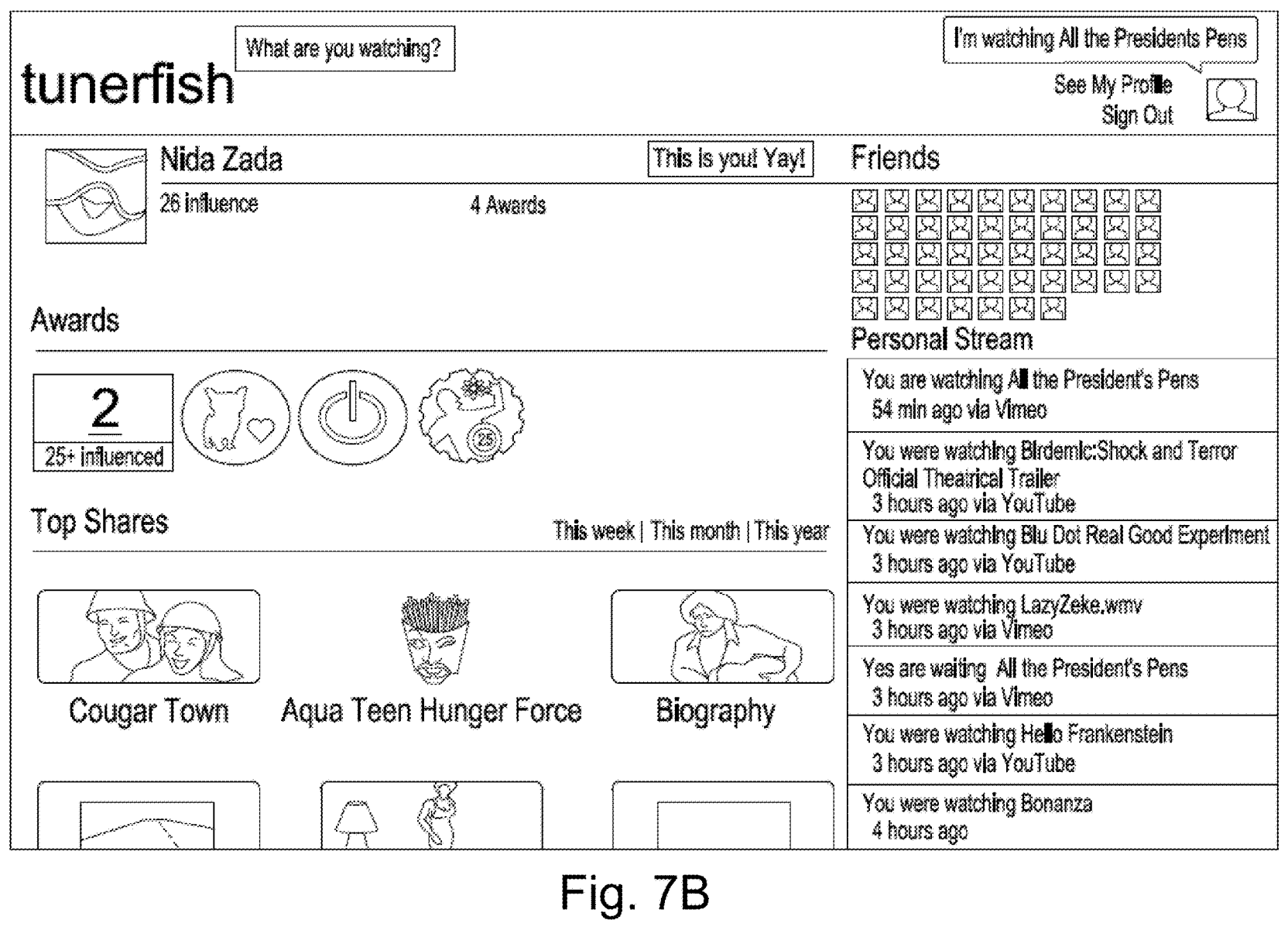

As another option, in step 318, the system may determine whether a user has requested to display profile information for a user (either the same user or a different one). If the user has requested to display a profile information screen, the system may retrieve the profile from storage in step 319, and generate the various displays for the screen in step 320. FIG. 7A illustrates an example user profile screen 700, which may display a variety of information about a particular user, while FIG. 7B illustrates an alternative with similar features. Biographical information 701 may be displayed, illustrating the user's name, a profile picture, and the user's recommendation level (an example of which will be described further below regarding FIG. 3C).

The user's profile may identify one or more content items 702 that the user has watched the most, awards 703 that the user has received, and followers 704 that the user has. As noted above, a user may offer chat posts regarding programs, and those posts may convince the friends to also watch the same program. Awards may be granted to the user for influencing or convincing the friends to watch, and those awards (represented by graphical icons, badges, or text) may be displayed in the awards 703 portion of the user's profile. The awards may be interactive. A friend viewing the profile of a user can hover a mouse pointer over the award's icon to see a short hover text description of the awards (e.g., "Awarded for Watching 5 Comedies"). Clicking on the award could open a pop-up display with even more information, such as a description of how the identified user actually received the award ("John Smith received this award for watching 5 episodes of 'Seinfeld'"), a leaderboard listing showing how quickly or efficiently other users have received the award (from the friend's list, the requesting user's friends list, a cross-section of the two, or from a local or global listing that lists award recipients based on their geographic location), identifications of additional rewards that come with the award (e.g., coupons or discounts that are granted with the award), or other information regarding the award. Further interaction, such as clicking the title of a program in the description, may lead the friend to a video on demand option to access the same content that the user watched.

The user can also choose to send a dedicated message to one or more friends, specifically recommending a particular piece of content to those friends. As a result of these recommendations, a user may develop a following of friends who appreciate the user's recommendations. For example, the profile server may maintain a listing of followers for each user, and may add a friend to the listing if the friend requests to be added, or if the friend accepts the user's recommendations more than a certain amount of times (e.g., once, twice, ten times, etc.).

After step 318 or step 320, the process may return to step 301 and begin the loop again. The process described is merely illustrative, so the various steps can be rearranged, combined, omitted and modified to suit any desired embodiment. For example, some of the processes can be broken up into multiple processes running concurrently on multiple application servers 107 or as parallel process threads.

Figure 3A:
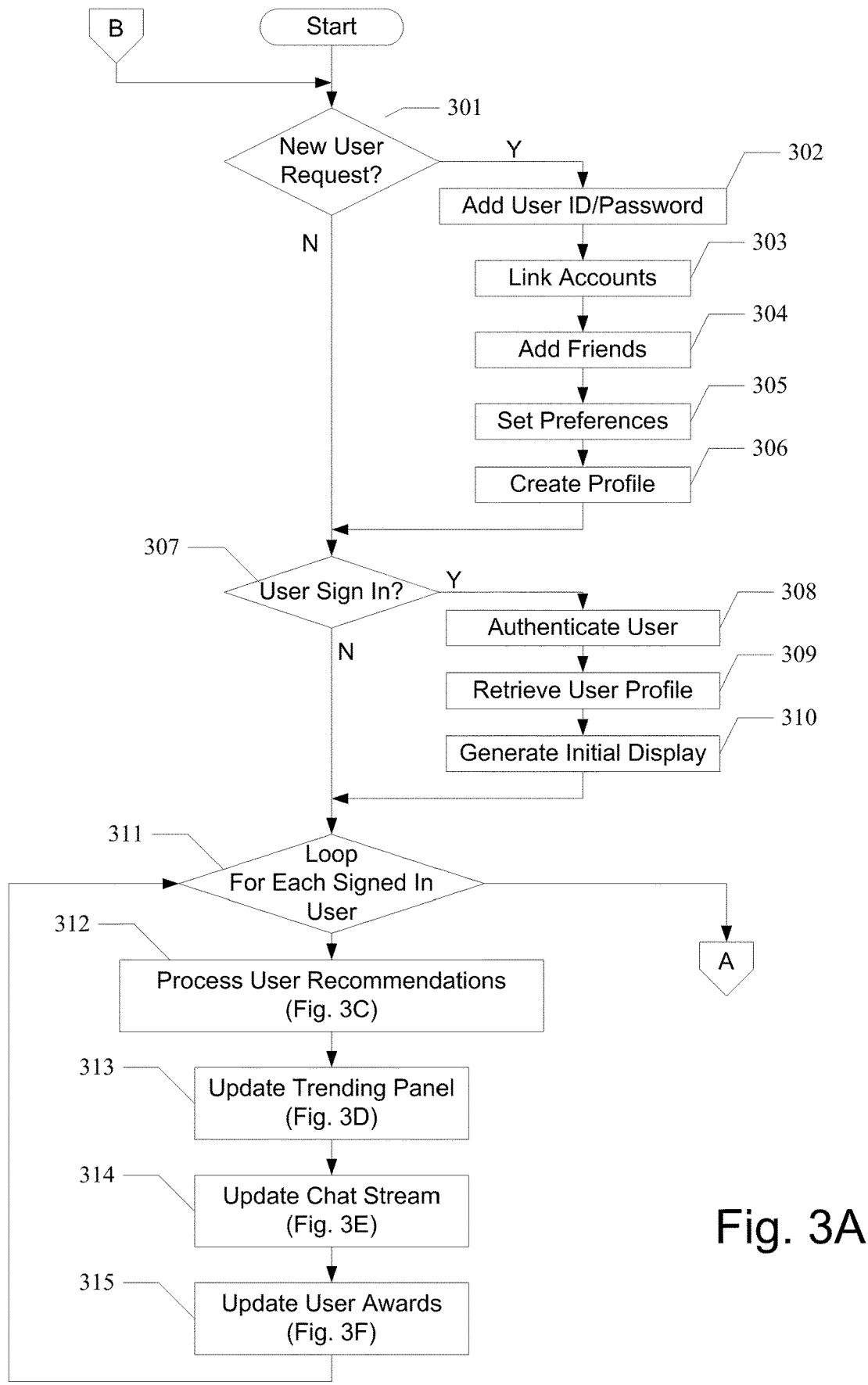
FIGS. 3A-F illustrate various example recommendation system processes.
Figure 3B:
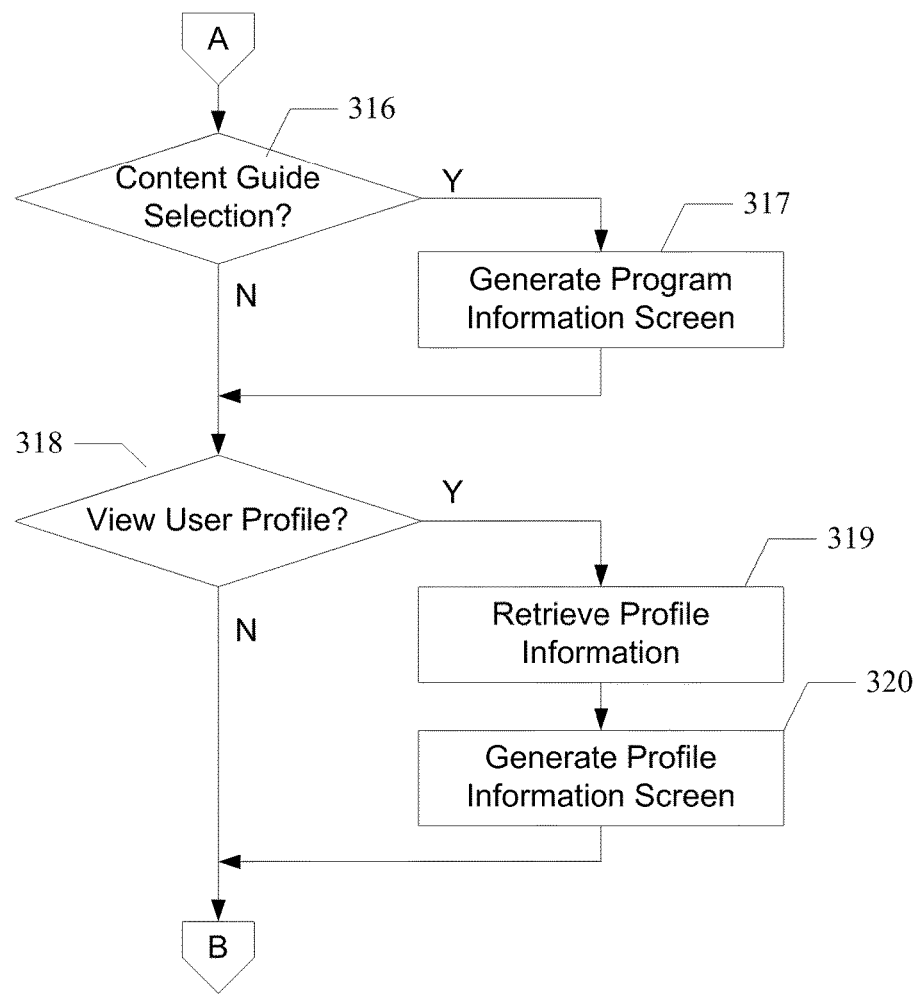
Figure 3C:
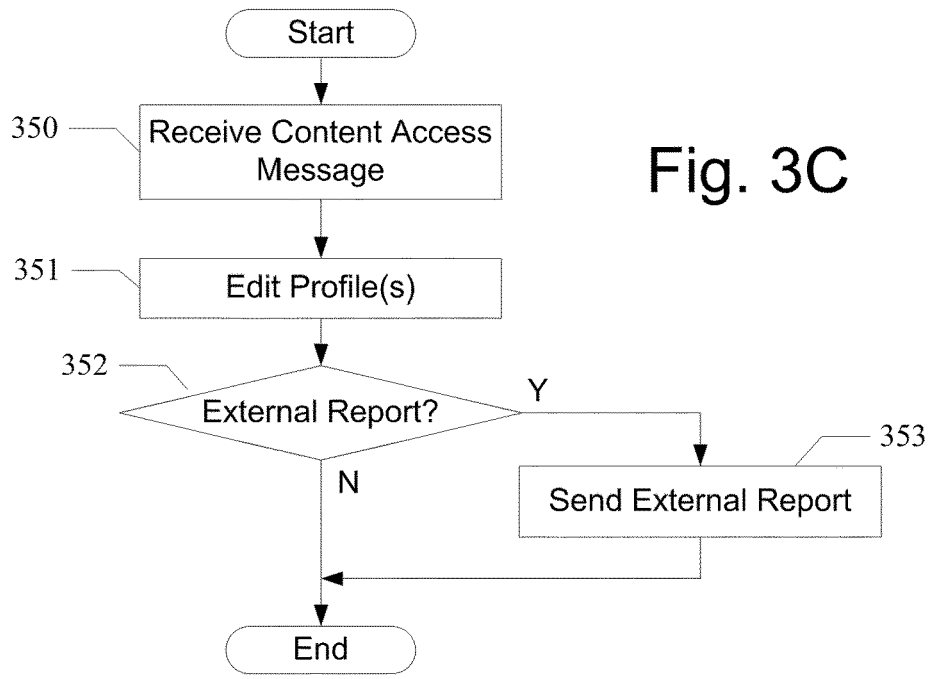
Figure 3D:
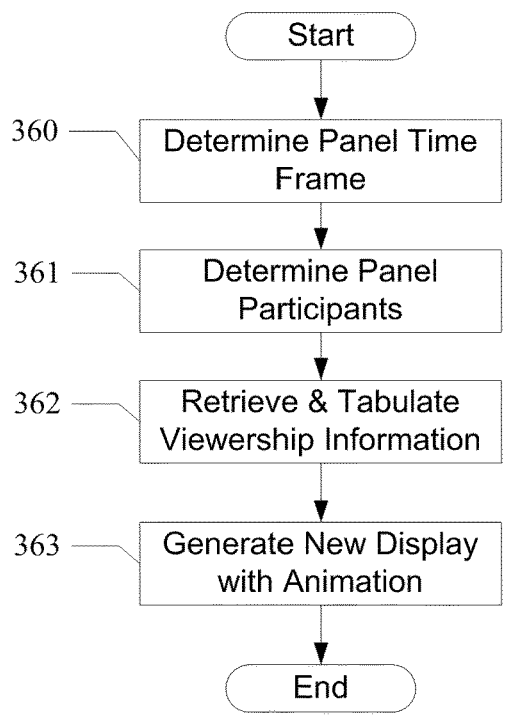
Figure 4:
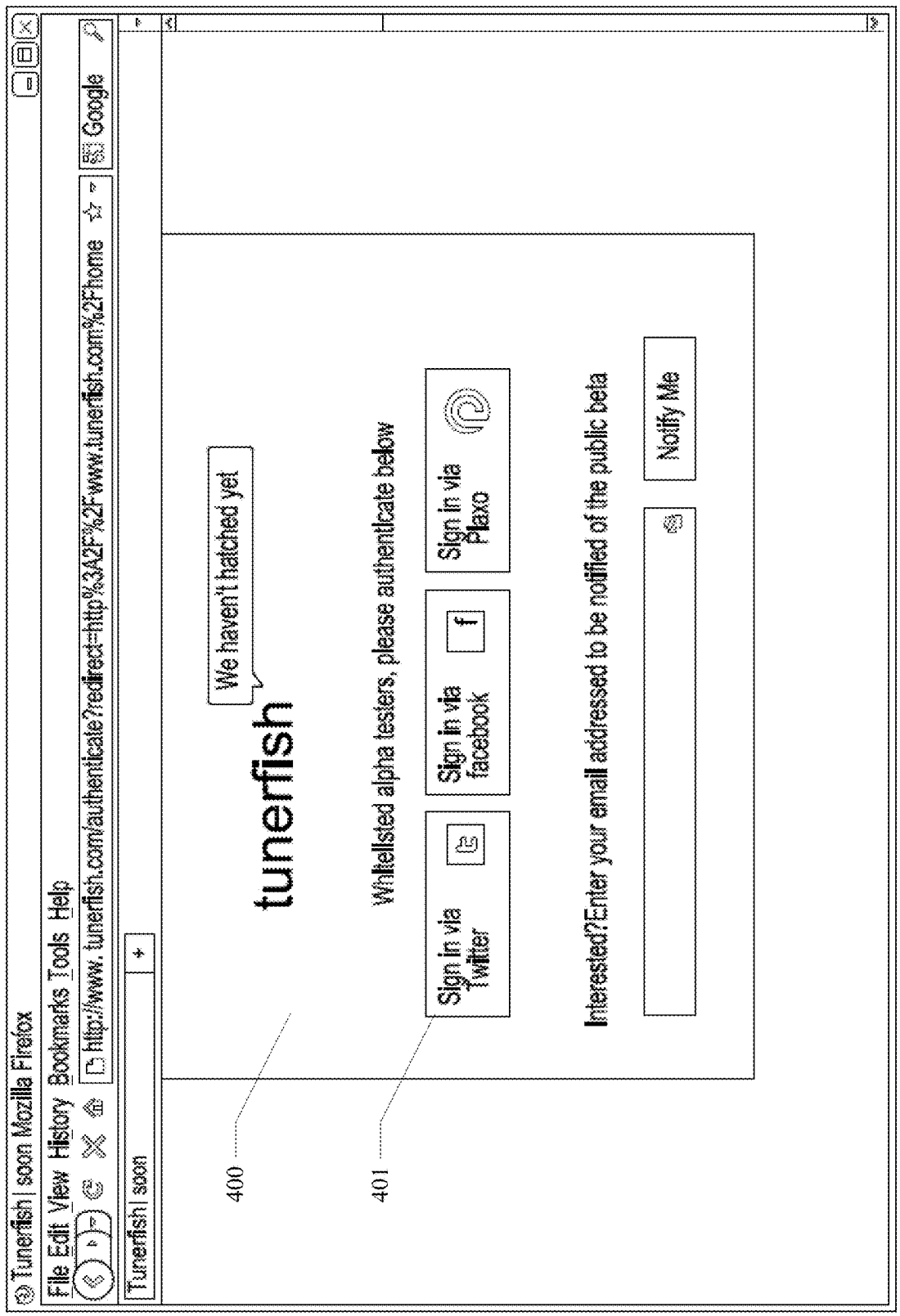
FIG. 4 illustrates an example login screen for a content recommendation system.
Figure 8:
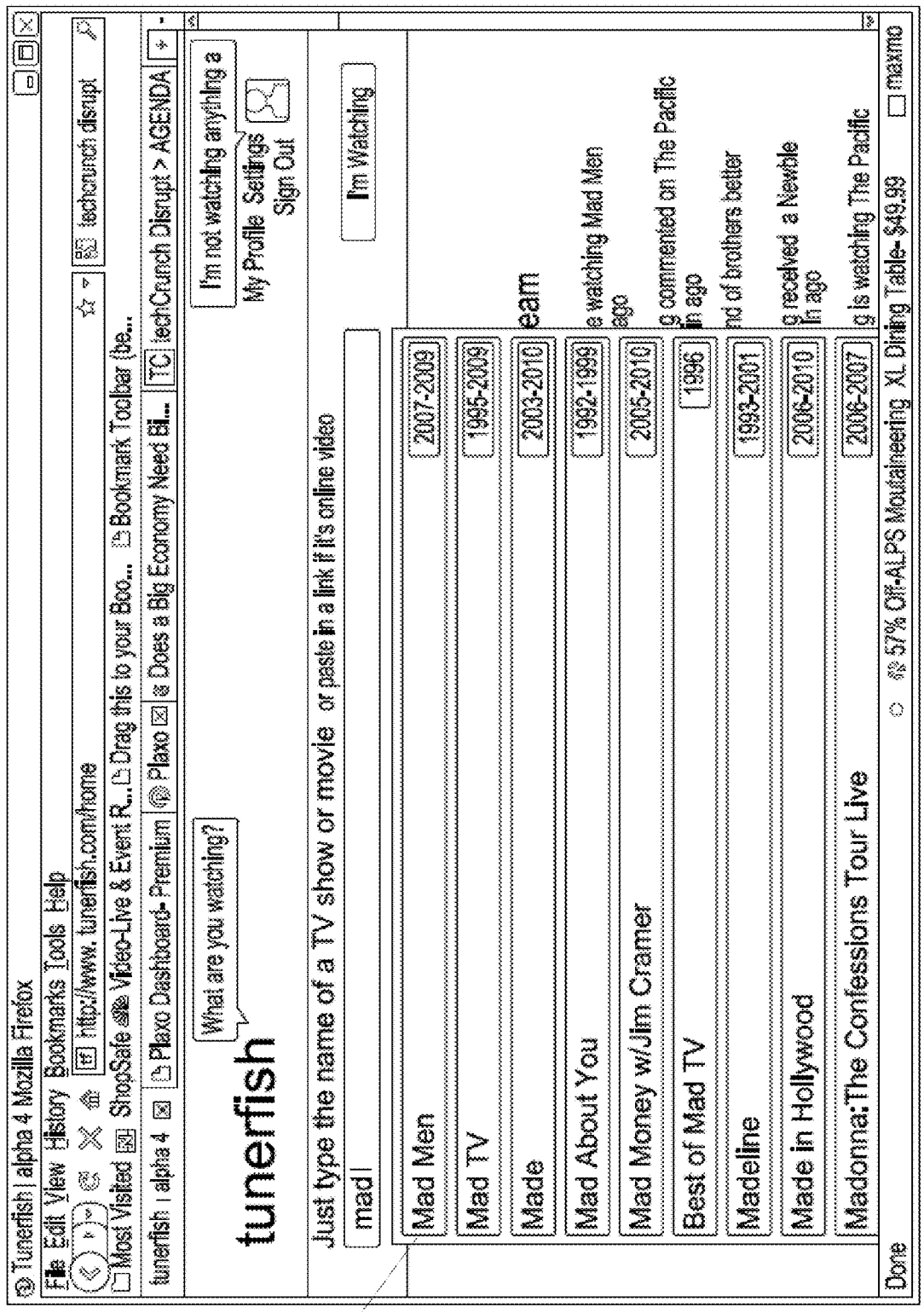
FIG. 8 illustrates an example autofill feature for a content recommendation system.

FIG. 3C illustrates an example process of handling a user's recommendations. As illustrated in FIG. 5A, a user may use a textbox 501 to identify a piece of content that the user is consuming (e.g., a television show that the user is watching) in step 350. The textbox 501 may accept text input, as noted above, but it can alternatively accept other types of input. For example, as a user begins typing a title, the textbox 501 may display a pulldown listing of possible programs having titles that match the entered characters. FIG. 8 illustrates an example of such an autofill, with pulldown listing 801. Another alternative may be to display Internet (or another network) links for content, if the content is available via Internet streaming. So, for example, the content title may be a URL (Universal Resource Locator) address. Alternatively, a user could choose an "I'm Watching Too" option 602 (FIG. 6) after viewing a program information screen 600 from a program guide, or after selecting it from the chat post or recommendation message of another user.

Figure 3E:
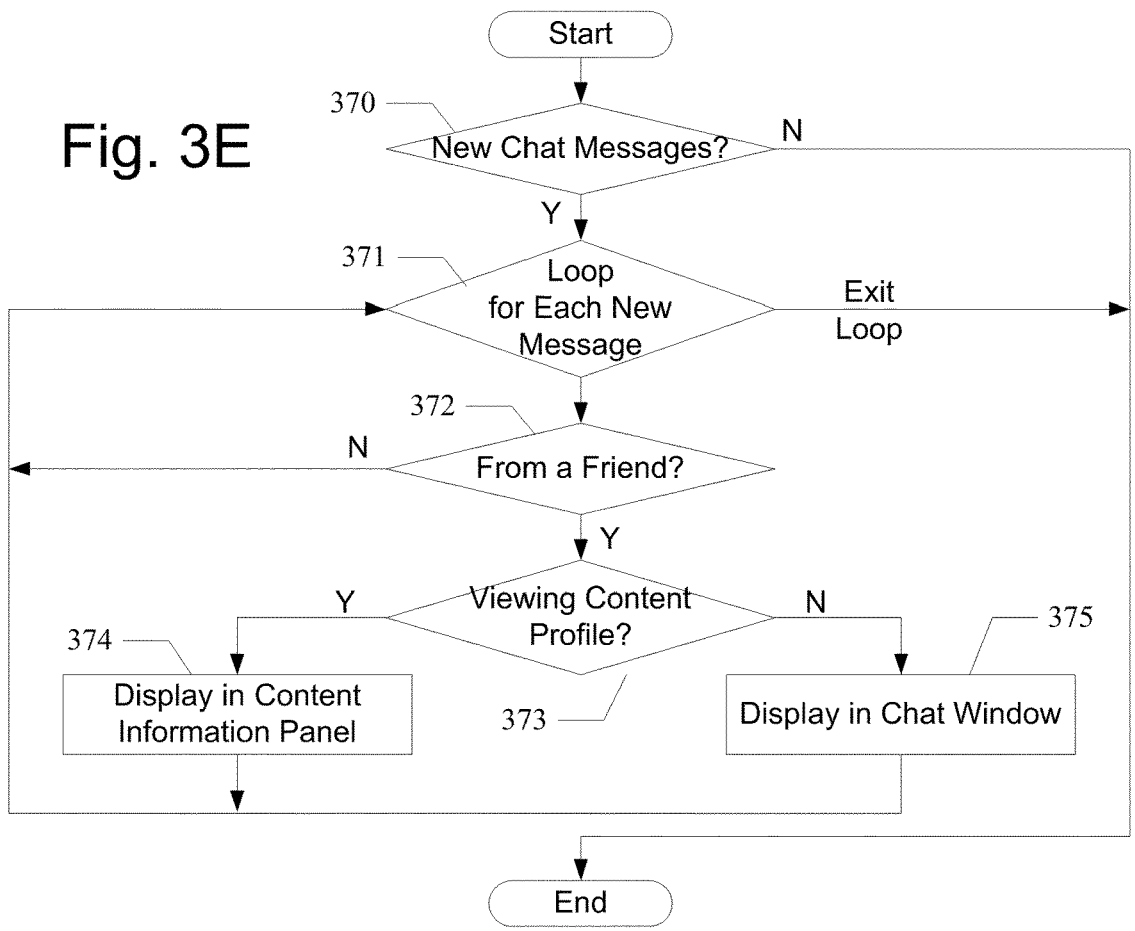
Figure 3F:
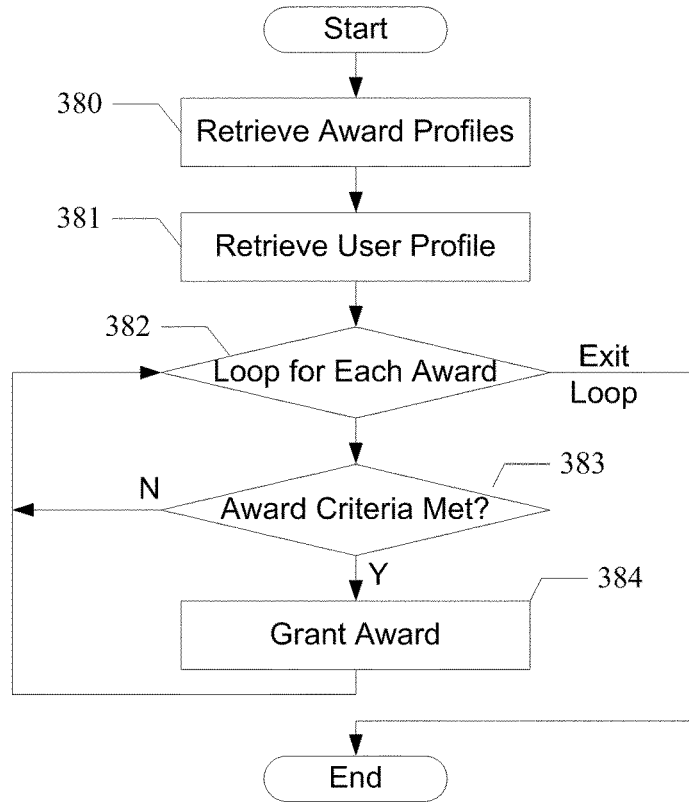

In step 351, the system may update the user's profile information file to indicate that the user is now consuming the identified content (e.g., the user's file may be edited to indicate that the user is now watching the television show "Mad Men"). The edited profile will allow the recommendation system to subsequently use the updated profile information when updating other aspects of the system, such as the information displayed to others (e.g., the live stream 504 may indicate that the user is now watching "Mad Men"), or information displayed in trending panels (FIG. 3D) and chat windows (FIG. 3E). In addition to editing the user's profile, the system may also edit a profile maintained for the content itself. For example, the system may monitor how often users systemwide view the "Mad Men" program, and this information may be maintained in a content profile along with the user profiles. Updating the profile in step 351 can also include updating other internal databases as well. For example, if the user began watching a program based on the recommendation of another user, then the system can track the viewing history of the user (e.g., note that the user chose the "I'm Watching Too" button 602, and identifying the other user whose post/message/recommendation led to this user's selection), and record that information as well for award purposes.

External systems may also be notified of the update. For example, the user may have linked various accounts in step 303 to the recommendation system. If those linked accounts are external to the recommendation system, and do not have access to the recommendation system's own databases, then the recommendation system may transmit a notification to the external system. So, for example, if the system determines in step 352 that the user has linked his/her account to an external Internet site, such as FACEBOOK™, then the system can transmit a message to a corresponding server for the FACEBOOK™ application (e.g., sending an email or push notification to a server identified by the user in the linking process) in step 353. The external message may identify the user and the content being accessed, as well as any other desired information. External messages may also be sent at the direction of the user, who can indicate that a particular comment should be posted to a different server or account.

These notifications, internal and external, may serve as a user's recommendations to others. As will be discussed below, the recipients of these recommendations will have the opportunity to respond to the recommendation by following the recommendation (e.g., indicating that the recipient is also watching), responding with chat comments, or any other desired response. Such responses can lead to awards for the recommender. For example, a user may receive a point each time they cause a friend to watch a show or post a comment about it.

FIG. 3D illustrates an example process of updating the trending panels 503 displayed to users. In step 360, the system may determine the time frame parameters for the trending panel. The time frame parameters may define the time range to be used when generating the listing in the trending panel. For example, the user may choose options of "This Week", "Today" and "Right Now". Choosing "This Week" would result in the system collecting content accessing information for the current week (e.g., collecting information identifying the television programs that were watched by various users in the current week, or the past 7 days). Similarly, the "Today" option would result in collecting information for the content accessed on the current date, while the "Right Now" option would result in collecting information identifying content that is currently still being consumed or accessed.

In step 361, the system can determine the user participation parameter for the trending panel. The user participation parameter may indicate the group of individuals to be used for the information collected. For example, the user can choose "Friends", which would result in the system collecting information about the user's friends' viewing habits during the desired time period (e.g., television programs my friends watched over the last week). Other groups of users may be used as well, such as family, or a group having all registered users of the recommendation service, social clubs, book clubs, groups affiliated with businesses, etc.

Once the trending panel parameters have been determined, the system can then retrieve information identifying the content that was accessed by the users in the determined group over the determined time frame. Gathering this information may involve retrieving it from a program profile and/or user profiles stored at the system's application server 107. This step may also include tabulations or calculations. For example, the system may need to generate totals indicating the number of viewers who watched a particular television show in the set time frame, and then sort those totals into a list, having the most viewed programs at the top. Another calculation may involve determining how many users are currently accessing the content (if the time frame is "Right Now"). For example, the system may calculate a total of the number of active streams that are streaming a particular piece of content; or the system can compare the start/end times of scheduled broadcast content (e.g., the 11 o'clock nightly news) with the current time and times of recommendations to determine if identified programs are currently being watched by their respective users. For example, if a user is watching and recommends a 30-minute program at 8 pm, then his/her recommendation may expire at 8:30, for purposes of tabulating the trending listings.

In some embodiments the totals may be dynamically updated as new users enter recommendations. Indeed, the various sub-processes and steps described herein are merely illustrative, and can be rearranged/modified as desired.

In some embodiments, the trending information can employ a trending social velocity. A viral velocity may identify how quickly a particular program is spreading through various friends lists via recommendations in a given time frame. For example, if the given time frame were 30 minutes, then the system can track, for each program, how quickly that program is being spread from friend to friend within that time frame. If a first user watches a program, and in the next 30 minutes there are 20 friends who watch the program based on the first friend's recommendation, and in the next 30 minutes there are 100 friends watching it from the first friend's recommendation (either directly from the friend's recommendation, or indirectly via an intermediate friend), then the program's trending social velocity may be 5× (e.g., indicating a five-fold growth in recommended viewings per 30-minute period). This social velocity for a program may be used to help sort the contents listed in the trending panel. For example, a program having a velocity greater than a given threshold (e.g., 5×/30 minutes) may be deemed a "hot" program, and may be indicated as such in the trending panel with an additional logo. Multiple social velocity thresholds may be defined, and different responses can be programmed for different thresholds. For example, a second threshold of 10× can be defined to indicate programs that are "spreading like wildfire." When a program has a velocity that exceeds this second threshold, the system can transmit additional messaging, such as having the program identified on the main login page, or sending requests to push notification servers 105 to cause a push notification message to be sent to the user's smart phone, announcing that a particular program is "spreading like wildfire" through the user's friend list (or through friends lists in general, such as his/her friends list, the friends' friends lists, etc.).

After step 362, the system may have a sorted list of content that has been accessed within the determined time frame by the determined group of users. This list may include a mixture of scheduled television content, premium video content, video on demand, Internet streaming content (e.g., posted videos from various Internet sites), etc. In step 363, when the sorted list of content has been generated, the system may generate a display of the listing for a user to see. As part of the display, the system can determine how the current list differs from the last time the list was generated. Since the lists may be generated rather frequently (e.g., the process in FIG. 3D could be performed continuously, or every few seconds, as desired in view of system resources), the pieces of content in the list may largely remain the same from one list to the next. When a piece of content moves to a different ranked position (e.g., an Internet video moves from the #2 spot to the #8 spot), the system can use an animated display to illustrate the movement of the content in the ranked list. For example, the system can use an animation to show the listing for the content leaving the #2 spot and sliding down the screen to the #8 spot.

Figure 9:
FIG. 9 illustrates an example user profile display screen with an award notification for a content recommendation system.

Alternative embodiments may modify the trending panel described above. For example, the panel may be modified to display multiple animated ladders for multiple trends. A user could, for example, request to see one trend ladder for his/her friends, and another trend ladder for a different group of individuals, such as a friend's friends, or users in the same city, or all users registered with the profile server, etc. One trend could list content that the user has recommended to others, and ranking them according to how popular those programs are, or according to how well-received his/her recommendations for those programs are (e.g., ranking by percentage of acceptances, or number of points awarded for each recommendation). For example, if a user has recommended the program "Gilligan's Island," the user can see a trend listing how well-received that recommendation has been. FIG. 9, discussed further below, illustrates an example screen having multiple trending displays.

Another example trend can list individuals who are in a user-created subset. For example, the user could define a list of college alumni, or scientists, etc., and see a separate trend listing for the popular content among those groups.

An alternative trend may be a listing of items other than content. For example, the trend could list people or friends. The friends could be sorted according to how influential they are, or according to how influential they have been to the user. For example, if a user has accepted more of Adam's recommendations and less of Bob's, then the trend could list the friends with Adam higher than Bob, since Adam has been more influential to the user. Similarly, the trend could rank friends according to how often those friends have been influenced by the user's own recommendations. As with the content trend, such a friend (or person) trend can also be animated to dynamically display shifting positions as the ranking changes.

In addition to displaying listings from the trending panels, the system can also give the user the option to send the listings to an external destination, such as the external DVR service discussed above. The user could be provided with an option to send a listing of some or all of the trending programs to the external service, and the external service can act on the information to set the user's DVR to record the programs, add the programs to an on demand playlist, or any other desired activity. For example, the user can request to have the top 3 programs in a friends group's trending panel identified to an external DVR service, and the system can transmit an external message to that service's server, identifying the programs and the user. The external message can also serve as a recommendation to a different user of the external service, and can identify the user as the source of the recommendation. For example, a user can request to transmit the listing to a friend (e.g., on the same system or in an external server), and the listing can be delivered to the appropriate server, identifying the sending user and the friend. When that friend next logs into the service (e.g., to their FANCAST XFINITY TV™ account, they may see a listing of recommended programs, and may be presented with a listing of programs recommended by the user, along with an identification of the recommender (e.g., a profile picture, a caption stating "Recommended for you by your Tunerfish™ friend John," etc.).

FIG. 3E illustrates an example process of updating a chat window, such as chat window 504. In step 370, the system can determine whether there have been any new chat messages that have been received since the last time this step was performed. A new message may simply be one that has arrived since the last time step 370 was performed. Alternatively, a message may be "new" if it simply has not yet been displayed to the particular user in question, or in the particular view being requested, and even if the message arrived prior to the last time step 370 was performed (e.g., it arrived but was not processed for display because it was not needed for the particular display being viewed).

Chat messages can come from a variety of sources. For example, whenever a user makes an entry into text box 501, that entry can be flagged as a chat message as well. So, for example, if the user were to enter "Mad Men" as a show they were watching, a chat message of "John Smith is watching Mad Men" may be generated by the system and stored as a new chat message in a memory of the recommendation system's application server 107. A user can also enter chat messages directed to a particular program, such as that shown in the program discussion panel 604. For example, the user can view the profile page for a particular program, and choose "Join Discussion" to open a chat window allowing them to enter a text chat message. The system can store that message, along with an identification of the content (e.g., the program) to which the message is directed.

Chat messages can also be a direct message come from other users. For example, the system can provide a user with the option to send a private chat message to a friend chosen from the user's friend list. Alternatively, a user's accounts at external networking sites, such as Facebook and Twitter, may allow the user to send a chat message to a particular user as well.

The system may store these messages, along with identifications of the sending user, the addressed user (if the message is directed to someone), time/date, source application (e.g., identifying the recommendation system, or an external Internet site, as the source of the message), and content to which the comment is directed (if any). So, in step 370, if new messages have been received, then the process may continue with step 371, in which the system may retrieve the new messages and begin to process them for possible display. Step 371 may begin a processing loop to handle each new message.

In step 372, the system may check to see if the message came from a friend of the user requesting the display. For example, the FIG. 3E process may occur when the user chooses to view a profile page for the "Mad Men" television show. The system may have received numerous comments from its various users about this program, and each message may identify the sender. In step 372, the system may compare this identification with the friends listed in the user's profile. If the message is not from a friend, then the process can return to step 371 to process the next new message. If the message is from a friend, then the process may determine, in step 373, whether the user was viewing the profile page for the content being discussed in the message, and if so, the message may be added 374 to the discussion panel 604 for that piece of content. For example, if the message were directed to the "Cupcake Cannon" Internet video, as illustrated in FIG. 6, then the message may appear in the discussion panel 604 of the information screen 600 for that piece of content, if the user happened to be viewing that screen 600. However, if in step 373 the system determines that the user was not viewing the program information screen 600 for that piece of content, then the system can add the message to the live stream chat window 504 instead. For example, if the viewer was not viewing the "Cupcake Cannon" screen 600, but was rather viewing the main screen 500, then the "I love cupcakes" comment could be displayed in the live stream 504 instead. FIG. 6 illustrates an example, in which Nida Zada has commented on the Cupcake Cannon content, but the user is viewing the main screen 500 (and not the program-specific screen 600 for the "Cupcake Cannon" content). After processing the current new message, the system may return to step 371, to process the next new message.

When the messages are posted, they may include selectable links. For example, a message indicating that a friend is watching "Cupcake Cannon" may allow the user to click on "Cupcake Cannon" in the message, and be brought to the program information screen 600 for the "Cupcake Cannon" content. From there, the user can view an ongoing discussion 604 of the program, and still monitor other discussions in the general chat window 504. The user may also see a listing 603 of other friends who are also watching the same content, and can choose the "I'm Watching Too" option 602. Choosing such an option may be treated as if it were entered in the text box 501 discussed above, and may serve as a recommendation.

As noted above, the recommendation system may monitor user activity, and grant various awards and perks to users based on those activities. Monitoring the activities may involve simply keeping a running log of every action taken by a particular user. For example, each time the user views a friend list, enters a program recommendation or comment, views a message, views a user profile, accesses content, etc., the application server 107 may store a data record of the activity in a memory 205.

FIG. 3F illustrates an example process of how information can be processed to grant awards to users. In step 380, one or more award profiles may be retrieved from storage.

An award profile may be a data file that identifies one or more awards, and the requirements needed to receive that award. For example, one award profile may grant a user an award for watching the "Caprica" television show five times. The award itself can be a simple graphical badge displayed with the user's online profile, or a textual title, or it can be monetized in some fashion, such as a discount on future purchases, monetary credit to a video-on-demand account, etc. Example awards are discussed in greater detail below.

In step 381, the current user's profile may also be retrieved. The user's profile may contain a log of all of the user's activities, broken down into whatever categories are desired. For example, the profile could track the number of times a user has watched each unique television program, or the number of times a user has influenced another user to choose the "I'm Watching Too" option 602.

In step 382, the system may begin a loop for each award. For each award, the system can determine 383 if the user has met the criteria for that award (e.g., has the user watched "Mad Men" more than ten times?), and if so, the system can grant the award to the user in step 384. Granting the award can simply involve editing the user's profile to indicate that this award has been received. The next time that user's profile is displayed 320, the system can include this new award in the display (e.g., displaying an icon or graphical badge for the award). In some embodiments, a new award message can be displayed to the user. For example, FIG. 9 shows an alternative main screen 900, in which an award message 901 is displayed. The award message may also include an option 902 to allow the user to post a comment about the award, and an option 903 to indicate where the user would like to comment to appear (e.g., only on the recommendation system's screens generated for users, and/or transmitted to external Internet sites for posting as well).

As noted above, the system can define a large variety of awards in the award profile. Some awards may be based on a point system, with users receiving certain amounts of points for different activities. For example, the system may grant 5 points each time a user views a particular television program, and 1 point each time a user's friend chooses the "I'm Watching Too" option 602 after viewing the user's own posting about the show. When that friend chooses the "I'm Watching Too" option, the system may edit the user's profile to add that point value, in addition to (or instead of) logging the individual action (e.g., the specific friend, the specific show, etc.). The system server may also define point levels (e.g., a level every 100 points, a level every 500 points, etc.), and a user's level may be displayed as part of his/her profile 701. The level may indicate how influential the user happens to be, and the award for being influential can include the credits or discounts (or other valuable consideration) mentioned above.

Other awards may be defined as well. For example, an award may be defined for watching the same program 5 times, or for persuading 100 friends to watch a program, or for posting 1000 comments, etc. The following lists examples of types of awards that can be defined and tracked:

Awards can be granted for consuming content. Some awards can reward passion or dedication to a show, and can be given to a user who watches a program five times. For this award, the award profile may define the program (or series) identifier, a threshold count, and the resulting award (e.g., graphical badge, title, monetary discount, etc.).

Awards can be granted for consuming content in predetermined genres. Various pieces of content may be categorized into genres (e.g., nature shows, reality television, comedy, horror, etc.), and some awards can be defined to recognize a user who has consumed sufficient quantities of content in a particular genre. For example, a "Survivalist" award may be granted to users who watch 10 or more programs in the survivalist genre (e.g., shows about human beings surviving in nature). The award can have multiple levels, with different titles and badges granted for different amounts of viewing (e.g., a different level and award for watching 25 and 50 programs in the survivalist genre). Some embodiments may only count distinct content (e.g., not granting awards for watching reruns, or for only watching a single series within the genre).

Awards can be granted for other quirky or unexpected behavior. For example, an "Easter Egg" award can be defined to grant a badge if a user watches five kitten videos in the same evening.

Site awards can be granted. Some awards can be define to encourage usage of various features of the recommendation system. For example, awards can be defined for posting a recommendation, following another's recommendation, influencing a certain number of friends, having a certain number of friends, etc.

Co-operative awards can be granted. Some awards can be defined to require participation by more than one user. For example, a specific recommendation award can require that a user successfully influence 10 friends to watch kitten videos in one evening. A user who wishes to obtain that award may publish number of kitten video recommendations in an evening, hoping enough friends help. The user may also post messages to the friends, informing them that he/she is pursuing an award, and asking their assistance in obtaining it.

The various awards may include time limits, and activities occurring outside of the time limits may be disregarded by the system when processing the award.

The system may also employ metrics to keep track of what awards are more effective in encouraging certain behaviors. For example, the system may monitor which awards are granted the most, when they are granted, which awards tend to get discussed the most, etc.

The following lists various award profile parameters that may be used in defining and tracking an award:

Award Identifier Information—Name of award, graphical assets (e.g., thumbnail images), hover text (description of the award to be displayed when a user hovers a mouse pointer over an award's name or icon), full description of award requirements.

Various awards may be defined. For example, awards can be defined for program genres (e.g., comedies, action movies, linear broadcast dramas, on-demand sporting events, etc.). An award for a genre may include information, at the server 107, identifying requirements for receiving the award. For example, an award for recommending comedies may require that the user successfully recommend a program in the comedy genre a predetermined number of times (e.g., 5 users must choose the "I'm Watching Too" option in response to the first user's post recommending the comedy). Multiple sub-levels may be defined for an award as well. For example, the comedy genre award may have three levels, one attained at 5 recommendations, one at 10 recommendations, and one at 25 recommendations. Each award and/or level may include a unique graphical badge or icon appearing in the user's profile.

The award information can also define additional parameters, such as a date and/or time that the particular award can (or cannot) be earned. For example, an award may be defined for a particular linear broadcast date and time (e.g., the season finale of a television series), and might only be earned if recommendations are successful during that time (e.g., if a user successfully recommends a program within the original air date and time of the season finale). Time ranges may also (or alternatively) be defined for an award.

Awards can be defined for specific programs. For example, an award may be defined for a predetermined linear broadcast television series (e.g., "Lost"), a move, an Internet program (e.g., The Guild), etc. Awards can be defined based on comment text used when a user recommends a program (e.g., via the comment interface shown in FIG. 5B). For example, an award's information can define one or more keywords or phrases that, when used to recommend a program, may result in credit towards receiving that award. For example, the Showtime program "Weeds" may encourage users to use positive language like the word "love" when recommending that program. A corresponding award's information may identify the keyword or phrase, the program to which it applies (e.g., if the keyword award is linked to predetermined programs), an identification of the number of times a user muse use the word to receive the award, and an identification of what is received when the award is received (e.g., the badge graphics, point credits, etc.). Another example award may involve users guessing the culprit's identity in a murder mystery. The culprit's name may be a keyword, and if a user enters a comment saying that name as the culprit, the user may receive an award at the program's conclusion.

Other awards may be defined for different types of content. For example, users may choose to recommend certain Internet pages or URL (Universal Resource Locators). The server 107 may store information identifying the number of times a user has successfully recommended URLs in general (e.g., regardless of the specific URL) or URL categories (e.g., recommendations for certain domains, such as "www.youtube.com," "www.vimeo.com, etc.") and grant an award accordingly.

Awards can also be defined for different metadata surrounding programs. For example, a program's listing information may identify people involved in the show. Awards can be defined for these people. For example, the system can grant an award to a user for successfully recommending 5 programs starring a predetermined actor, or 5 programs directed by a predetermined director.

The profile server may track the user's progress towards each of these awards, and when a user reaches it, the profile server may add an award label to the user's profile, and display the label in an awards portion 604 of the profile. The server may also transmit a message to the gateway 111, consumption device, or any other device to cause a pop-up message to appear on the viewing screen ("You have just received the 'Comedian' Award"); and the server may request that the push server transmit a push notification to one or more push devices that the particular user has registered. The combination of points, levels and awards may create a more dynamic and engaging consumption experience for users. Additionally, perks and privileges may be granted to users who reach certain predefined levels. For example, a user who reaches level 10 may be entitled to a discount on their bill, or early access to previously unreleased content (e.g., an opportunity to purchase a video-on-demand movie a few days before the general population can), or any other desired benefit.

The awards may be defined by personnel, for example, at the profile server. Alternatively, awards may be defined by users and customers, and uploaded to the profile server. For example, the profile server may download an application to the user's gateway 111 or content consumption device 113, and the application may provide a user interface by which a viewing user can define an award. In some embodiments, the ability to upload an award may itself be part of an award, and reserved for recommenders who have attained a predetermined recommendation level (e.g., recommenders may be required to successfully make 1,000 recommendations before being allowed to upload their own awards).

One example of a user-generated award is a scavenger hunt. The user creating this award may be permitted to peruse an electronic program guide and select a number of upcoming programs that will need to be watched in order to receive the award. The user can tag individual episodes (e.g., this Thursday's episode of "The Beverly Hillbillies"), or the user can specify a minimum number of episodes that must be watched to receive the award (e.g., all 15 episodes of "CSI" that are airing this Thursday). The user can also identify multiple programs to be in the scavenger hunt (e.g., identifying episodes from "The Beverly Hillbillies" and "CSI"). In some embodiments, listings of users' favorite shows, or the trending panel in FIG. 5B, may be selected as the program listing for a scavenger hunt.

In some embodiments, the scavenger hunt may require in-program interaction on the part of the viewer. For example, the award generation application may identify one or more events that can occur in the show, and the award can require that viewers press a predefined button on their remote control when they observe the identified event occurring. For example, the event can be a character speaking a certain keyword, and viewers must press the "UP" button on their remote control whenever they hear a character say that word.

The predefined events may be defined with advertisers in mind, or by advertisers. For example, the event may be the onscreen appearance of certain products, such as the appearance of a can of Red Stripe beer. In some embodiments, the appearance can be tied to certain characters (e.g., only press the button when you see Nick drinking the Red Stripe beer). The various event identifiers can be provided along with (or apart from) the program content itself (e.g., identifying available events that have been flagged by the program provider, and allowing the award-creating user to choose among them for their scavenger hunt).

In addition to defining the requirements for the award, the uploading user may also define rewards. For example, the user may upload or select (from a predetermined list supplied with the award creation application) a badge image and badge name for the award. The user may also choose a reward other than the badge. For example, the program provider may offer coupons or discounts as available rewards, and the user creating the scavenger hunt may select a coupon or discount to include with the award that he/she is creating.

A user who wishes to participate in the scavenger hunt may select it (e.g., from another user's profile, or from an Internet listing of available awards), and choose to have the required programs tagged on their own DVR for recording and/or watching. For example, the profile server handling the award may receive the user's request, and transmit a message (e.g., via EBIF messaging) to the user's gateway 111 or DVR 113 to have the required listing of programs added to the user's recording list and/or reminder list.

With the features described above, users may influence the decisions of their friends, such as causing their friends to tune in to watch a particular television show, or download an Internet video. This influence can be measured and used to encourage more user participation, and to provide flexibility in recommending programs.

In some instances, multiple users may recommend the same program, and in those instances all of the recommending users may receive a point. In some alternative embodiments, one or more attribution schemes can be used to limit the amount of points awarded to the recommenders, or to determine who among them will receive the point(s) for influencing a friend. For example, if 100 members are all watching the show "30 Rock," and a friend of theirs begins watching that show, the profile server may implement an attribution system to determine which subset of the 100 actually get credit for influencing the friend. To determine attribution, the editing of a user's profile in step 351 can further include implementing an attribution scheme.

Figure 10:
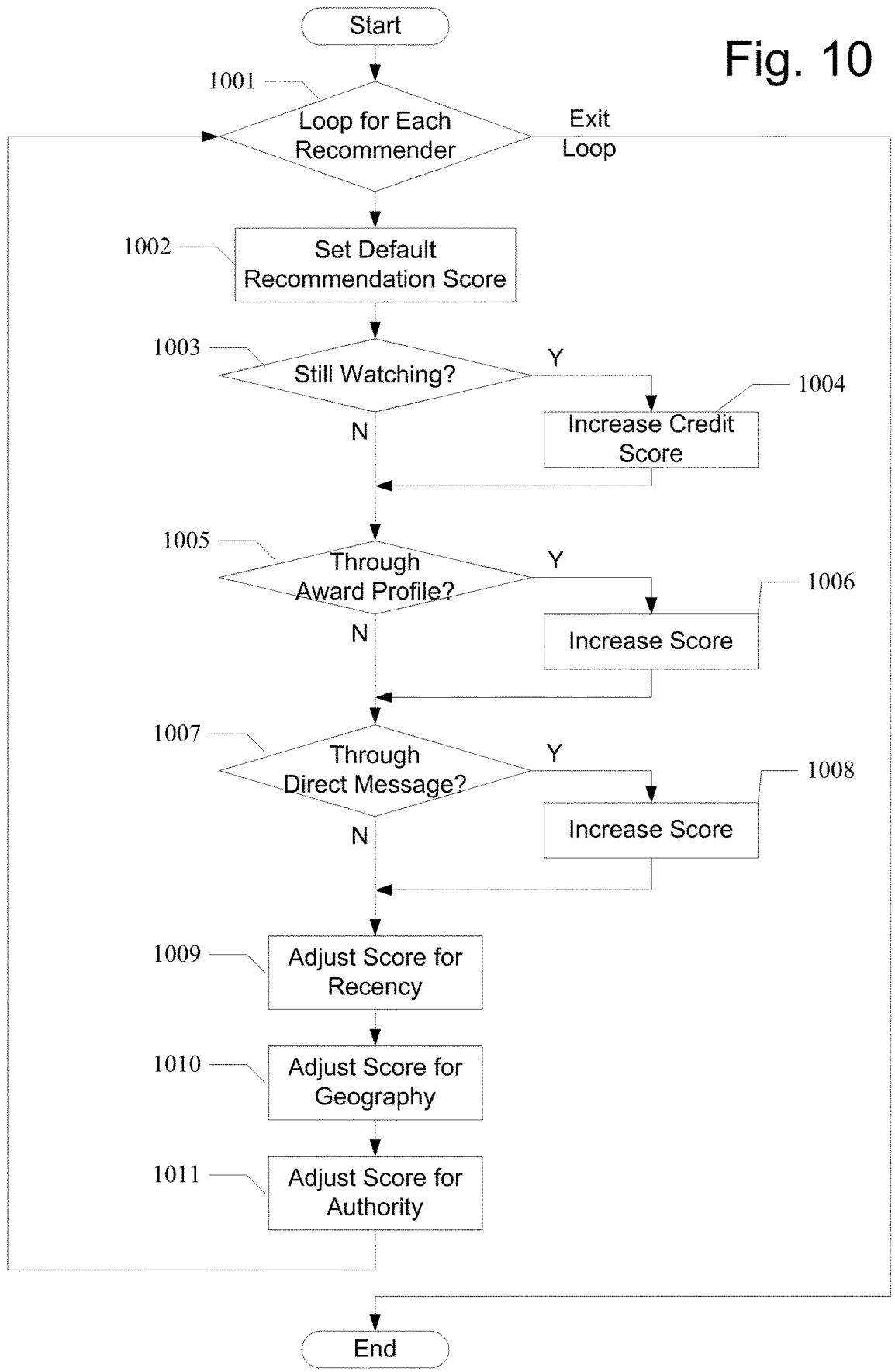
FIG. 10 illustrates an example attribution process for a content recommendation system.

Various attribution schemes can be used to determine which user(s) receive credit for persuading a particular friend of theirs to access recommended content. FIG. 10 illustrates an example process of attribution employing a variety of scheme factors. The process can begin when, in step 351, the system determines that attribution is needed. For example, attribution can be needed if the user who indicates they are watching a particular show does so in response to another user's comment or recommendation, or by selecting the "I'm Watching Too" option 602 after viewing a program's information screen 600 in response to another user's comment.

Referring to FIG. 10, In step 1001, the system can begin a loop for each of the possible recommenders (e.g., each commenter who recommended a show that a friend eventually chose to watch). In step 1002, the system may establish a default recommendation credit score. The default score can be any value, such as one, and can be adjusted upwards or downwards depending on the attributions factors discussed below. The example of one is just that: an example. Other values can be used.

In step 1003, the system may determine if the recommender is still watching (or otherwise accessing) the recommended content when the friend started watching (e.g., when the friend chooses the "I'm Watching Too" option). For example, each recommendation or comment posted by a user can be associated, by the recommendation system server, with a time-to-live value based on the remaining duration of the content. For example, the time-to-live value can be the original duration of the content, such as an hour. In step 1003, the system can identify the original posting time of the recommendation, the duration of the content (e.g., an hour), and if the current time is within the duration of the content (e.g., within an hour of the posting), then the process may proceed to step 1004 to increase the recommender's recommendation credit score on the assumption that the recommender is still watching the show (because it likely hasn't ended yet).

In some embodiments, instead of using the original entire duration of the content, the system can determine the recommender's current position within the content at the time of the recommendation, and determine a time at which the recommender will no longer receive credit for a recommendation because the recommender's program will have ended. For example, if the recommender was halfway through a 30-minute program when making the original recommendation, then the system can determine, in step 1003, that the recommender will only receive credit for followers who join in within the second half of the program (or 15 minutes after the recommender's post).

The above example can be one example for on-demand content. In the case of scheduled broadcast/multicast/unicast, or other transmission-type programs, the recommendation system can access the schedule and determine whether the program is still on. For example, if the recommender indicated that he/she is watching "Mad Men" during its original air time, and a subsequent user chooses to watch it later on demand after the original airing has ended, the system can determine in step 1003 that the recommender is no longer actually watching "Mad Men" since the show has ended.

This determination 1003 can also examine the recommender's own profile, to determine if that recommender has since indicated that he/she is watching a different program. For example, if the user posts at 9 pm that he/she is watching "Mad Men," but then posts at 9:15 pm that he/she is watching "Real Housewives," then the system can determine that the user is no longer watching "Mad Men" because that posting has been superseded. If the current user has chosen to watch "Mad Men" at 9:30 pm, then the system can assume in step 1003 that the recommender is no longer actually watching "Mad Men."

Another attribution factor may depend on the manner in which the friend ultimately chose to access the recommended content. For example, a friend could be led to a program by a user's profile information. For example, if a user has received an award for watching the same program 5 times, and the friend views that user's profile, the friend could see the award, and could click on it to see how the user received the award. The explanation for the award could be displayed on the friend's display screen, and can include a textual description of the award's criteria (e.g., "Watch 5 episodes of a comedy") along with an identification of how the user received this particular award ("Bob watched 5 episodes of 'Seinfeld'"). Seeing this, the friend can click on the listing of "Seinfeld", and request a video on demand stream session of the same episodes of "Seinfeld." In this case, in step 1005, the system can determine that the viewer accessed the content after viewing the user's awards information in the user's profile, and the user could have his/her attribution credit score raised a set amount in step 1006.

As another alternative, a user can directly send a message (e.g., an email, or unicast post, etc.) to a friend, recommending a program, and the receiving friend could respond to the message by agreeing to begin watching the recommended program. In that event 1007, the user who sent the message may receive more point(s) for the recommendation than other friends who may have also recommended the same program, and that user's score can be increased in step 1008 accordingly.

In some embodiments, point values for recommendations may be greater with recency 1009. For example, if two users recommended a program, but one recommended it more recently than the other, the more recent recommender may receive more points for a friend who begins to access the recommended content.

In some embodiments, attribution can take into account geographic location 1010. For example, if the friend is using a mobile device to access content, and the mobile device is provided with location information (e.g., having an on-board global positioning system, or receiving an external signal informing it of its position), the recommendation server can use the location to adjust the point values given to different recommenders. For example, recommenders that are geographically closer to certain locations, or closer to the influenced friend, may receive higher point values than the more distant recommenders. The geographic location can also be used to determine the time-to-live or expiration time value for a recommendation. For example, the profile server may obtain the recommender's position, and then consult a database to determine what service providers are offering service to the recommender, and to obtain the program schedule for the service provider, and thereby obtain the start/end time of a linear scheduled program.

In step 1011, a recommender's attribution score can be adjusted for his/her level of authority in the content that was recommended. In some embodiments, the server may identify content that a given user recommends, or content that the user receives a large number of points for recommending, and deem that user to be an authoritative or influential person for that piece of content. For example, if an authority threshold of 1000 points is used, and a given user receives 1000 points for recommending the program "The Tudors," then that user can be deemed an influential person for "The Tudors." Further recommendations by that influential person for "The Tudors" may be worth an increased (or decreased) number of point values for the influential person, as compared to other recommenders. The example above identifies individuals who are influential for a given piece of content, but other types of influences can be tracked as well. For example, a user could be deemed an authority on a content genre (e.g., science fiction steampunk) because he/she has received the most recommendation points for content in that genre.

The example above begins with a baseline score and adjusts it upwards. In alternative embodiments, negative adjustments can be made to reduce recommenders' scores as well (e.g., instead of increasing one recommender's score, it can simply decrease other recommenders' scores). Also, the individual adjustments in steps 1004, 1006 and 1008-1011 can be weighted in any desired manner, to emphasize whichever aspect the system implementer wishes to emphasize. For example, if the system implementer wishes to encourage more use of direct message recommendations, the increase in step 1008 can be proportionally more than the other increases. Similarly, some of the attribution factors can be omitted if desired, and others can be used if desired.

In the discussion above, a viewer may voluntarily report their current viewing by, for example, entering the program title of what they are currently watching. In some embodiments, this voluntary self-reporting by a user can be made using any desired device (e.g., via an Internet-connected computer different from a device used to view the program), and the system need not take any measures to independently confirm whether the viewer truly is watching what they say they are watching. In some embodiments, the system may perform a verification process to make this confirmation. For example, an application server 107 may associate a user with a particular gateway 111 and/or computer 115 upon initial setup (e.g., linking a customer login on the interface 501 with a gateway 111 address (e.g., its MAC address, or an address in the network identifying the gateway 111's central office, port, etc.), and in response to a user reporting a viewing, the server may transmit a request to the user's gateway 111 (or to a specific consumption device, such as computer 115) to request confirmation of the content currently being rendered or displayed by the device. The gateway 111 or consumption device may then respond by identifying the content it is currently displaying, and the application server 107 may then compare the response with what the viewer entered to verify. If there is a match, then the viewer is granted whatever award or credit is earned by the viewing. If there is no match, then the award or credit can be withheld pending further follow up with the user (e.g., a service representative email inquiry), or the award/credit can simply be denied as being unverified.

The viewer's self-reporting may also be handled differently. For example, instead of having the user enter a title or program selection via the interface 501, the user's own gateway 111 or consumption device may transmit a message to the application server 107 to report on the viewing. In some alternative embodiments, the user may be using an Internet-based remote control for selecting the viewing (e.g., using an Internet application to choose a program and start playback on a different device), in which case an application server 107 handling the remote control request may already know what content is being streamed to the user (or the user's requesting device), and that server can report (or provide upon request) identification of the user's viewing as needed. Of course, privacy concerns may affect how these kinds of automated reporting are handled (e.g., a user may need to consent to the transmission of viewing information).

Although example embodiments are described above, the various features and steps may be combined, divided, omitted, and/or augmented in any desired manner, depending on the specific recommendation process desired. The scope of this patent should only be defined by the claims that follow.

We claim:

1. A method comprising:
   sending, by a computing device and to a second user device, information comprising:
      an indication that a first user device is outputting a content item; and
      a recommendation, from the first user device, for the content item;
   determining a time remaining within the content item at a time of the recommendation;
   receiving, by the computing device and from the second user device, an indication that the second user device is outputting, based on the recommendation, the content item;
   granting, by the computing device and based on determining that a time associated with the indication that the second user device is outputting the content item is within the time remaining, a recommendation credit for a first user associated with the first user device; and
   storing, by the computing device, information indicating the recommendation credit for the first user.

2. The method of claim 1, further comprising:
   sending, by the computing device and to the first user device for display, profile information indicating a level of influence that the first user has over content consumers and a graphic identifying an award received by the first user for influencing the content consumers to watch one or more content items.

3. The method of claim 1, further comprising:
   storing, by the computing device, award profile information indicating content recommendation criteria for granting a corresponding award to a recommending user who recommends the content item, wherein the content recommendation criteria comprises one or more of a quantity of recommendations made by the recommending user or a quantity of other users who viewed the recommended content item based on the recommending user's recommendation; and
   granting, based on the recommendation satisfying the content recommendation criteria, the corresponding award to the first user.

4. The method of claim 1, wherein the granting the recommendation credit for the first user is further based on a geographic proximity of the first user to a second user associated with the second user device.

5. The method of claim 1, further comprising granting a user defined award by processing a user-defined award profile that identifies one or more user-defined awards and at least one criterion for granting the one or more user-defined awards.

6. The method of claim 5, wherein the at least one criterion indicates a plurality of programs to be viewed for the user defined award to be granted.

7. The method of claim 1, further comprising:
sending, by the computing device and to the first user device for display, a graphic identifying an award received by the first user for influencing content consumers to watch one or more content items;
receiving, by the computing device and from a third user device, an indication that the third user device is outputting, based on interacting with the graphic identifying an award received by the first user, one of the one or more content items associated with the award;
granting, by the computing device, based on the indication that the third user device is outputting the one of the one or more content items, another recommendation credit for the first user; and
storing, by the computing device, information indicating the another recommendation credit for the first user.

8. The method of claim 1, further comprising:
storing, by the computing device, award profile information indicating content recommendation criteria for granting an award to a recommending user who recommends the content item, wherein the content recommendation criteria comprises a quantity of other users who viewed the content item, based on the recommending user's recommendation, and within a specified time range; and
granting, based on the recommendation satisfying the content recommendation criteria, the award to the first user.

9. The method of claim 1, further comprising:
storing, by the computing device, award profile information indicating content recommendation criteria for granting an award to a recommending user who recommends the content item, wherein the content recommendation criteria comprises one or more keywords included in one or more of data or metadata associated with the content item; and
granting, based on the recommendation satisfying the content recommendation criteria, the award to the first user.

10. The method of claim 1, wherein the recommendation is by the first user.

11. The method of claim 1, wherein the determining time remaining is based on the information comprising the recommendation.

12. The method of claim 1, wherein the receiving the indication that the second user device is outputting the content item comprises receiving an indication that the second user device is outputting, in response to the recommendation, the content item.

13. The method of claim 1, wherein the granting the recommendation credit comprises increasing the recommendation credit for the first user.

14. A method comprising:
receiving, by a computing device, information associated with a recommendation for a content item that a first user device is outputting, wherein the recommendation is associated with a first user;
determining a time window based on a duration of the content item and based on a time of the recommendation;
sending, by the computing device and to one or more other user devices associated with one or more other users, the information associated with the recommendation, wherein the one or more other users are associated with a first user profile for the first user;
receiving, by the computing device, an indication that a second user device of the one or more other user devices is outputting, based on the information associated with the recommendation, the content item;
granting, by the computing device and based on determining that a time associated with the indication is within the time window, a recommendation credit for the first user; and
storing, by the computing device, information indicating the recommendation credit for the first user.

15. The method of claim 14, further comprising:
retrieving a stored level of authority in the content item for the first user; and
adjusting the stored level of authority based on the recommendation credit.

16. The method of claim 14, further comprising:
adjusting the recommendation credit based on a geographic proximity of the first user device to the second user device.

17. The method of claim 14, further comprising:
determining that the first user satisfies a level threshold;
receiving, from the first user device, information for a user defined award including at least one criterion for granting the user-defined award; and
causing at least one of the one or more other user devices to display the information for the user defined award.

18. The method of claim 14, further comprising:
determining that a plurality of recommending users, including the first user, deserve recommendation credit for persuading the one or more other users to view the content item; and
adjusting a recommendation credit for the plurality of recommending users based on relative levels of authority, of the respective recommending users, in the content item.

19. The method of claim 14, wherein the determining the time window is further based on a geographic location of the first user device.

20. The method of claim 14, further comprising:
adjusting the recommendation credit based on a geographic proximity of the first user device to a designated location relative to a geographic proximity of another user device, associated with another recommendation for the content item, to the designated location.

21. The method of claim 14, further comprising:
adjusting the recommendation credit based on a level of authority of the first user in the content item relative to a level of authority of another recommending user in the content item.

22. The method of claim 14, wherein the information associated with the recommendation comprises the recommendation, and the recommendation is by the first user.

23. The method of claim 14, wherein the determining the time window is further based on the information associated with the recommendation.

24. The method of claim 14, wherein the receiving the indication that the second user device is outputting the content item comprises receiving an indication that the second user device is outputting, in response to the recommendation, the content item.

25. The method of claim 14, wherein the granting the recommendation credit comprises increasing the recommendation credit for the first user.

26. A method comprising:
receiving, by a computing device, information associated with a recommendation for a content item being output by a first user device and associated with a first user;
determining a time remaining within the content item and corresponding to the recommendation;
sending, by the computing device and to one or more other user devices associated with one or more other users, the information associated with the recommendation, wherein the one or more other users are associated with a user profile of the first user;
determining, by the computing device, that the content item is being output by the one or more other user devices based on the information;
assigning, by the computing device, based on a level for the first user, and based on determining that a time associated with the determining that the content item is being output by the one or more other user devices is within the time remaining, a recommendation credit for the first user; and
storing, by the computing device, the recommendation credit for the first user.

27. The method of claim 26, further comprising:
receiving one or more user-uploaded awards associated with the content item, wherein the one or more user-uploaded awards are uploaded by content consumers that have attained a predetermined level.

28. The method of claim 26, further comprising:
granting different recommendation credits for the first user for different types of recommended content; and
storing information indicating the granted recommendation credits for the first user.

29. The method of claim 26, wherein the information comprises the recommendation, and the recommendation is by the first user.

30. The method of claim 26, wherein the determining the time remaining is based on the information.

31. The method of claim 26, wherein the determining that the content item is being output by the one or more other user devices comprises determining that the content item is being output by the one or more other user devices in response to the recommendation.

32. The method of claim 26, wherein the assigning the recommendation credit comprises increasing the recommendation credit for the first user.

* * * * *

UNITED STATES PATENT AND TRADEMARK OFFICE
CERTIFICATE OF CORRECTION

PATENT NO. : 10,805,102 B2
APPLICATION NO. : 13/106483
DATED : October 13, 2020
INVENTOR(S) : McCrea et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*